US012678687B2

(12) United States Patent
Lu

(10) Patent No.: US 12,678,687 B2
(45) Date of Patent: Jul. 14, 2026

(54) BUTTON MODULE AND GAME CONTROLLER WITH THE BUTTON MODULE

(71) Applicant: Shenzhen Jierui Hong Electronics Co., LTD, Shenzhen (CN)

(72) Inventor: Chunming Lu, Shenzhen (CN)

( * ) Notice: Subject to any disclaimer, the term of this patent is extended or adjusted under 35 U.S.C. 154(b) by 258 days.

(21) Appl. No.: 18/432,308

(22) Filed: Feb. 5, 2024

(65) Prior Publication Data

US 2025/0058212 A1 Feb. 20, 2025

(30) Foreign Application Priority Data

| | | | |
|---|---|---|---|
| Aug. 18, 2023 | (CN) | ......................... | 202322231931.X |
| Aug. 29, 2023 | (CN) | ......................... | 202322323206.5 |
| Aug. 29, 2023 | (CN) | ......................... | 202322323208.4 |
| Sep. 25, 2023 | (CN) | ......................... | 202322599489.6 |

(51) Int. Cl.
*A63F 13/24* (2014.01)
*A63F 13/22* (2014.01)
*H01H 13/14* (2006.01)

(52) U.S. Cl.
CPC .............. *A63F 13/24* (2014.09); *A63F 13/22* (2014.09); *H01H 13/14* (2013.01)

(58) Field of Classification Search
CPC .................................. A63F 13/22; A63F 13/24
See application file for complete search history.

(56) References Cited

U.S. PATENT DOCUMENTS

| | | | |
|---|---|---|---|
| 6,580,039 B2 * | 6/2003 | Nakade ................ | H01H 25/041 |
| | | | 200/18 |
| 2001/0008849 A1 * | 7/2001 | Komata ............... | H01H 13/785 |
| | | | 463/36 |
| 2007/0281787 A1 * | 12/2007 | Numata ................ | A63F 13/218 |
| | | | 463/36 |
| 2011/0011715 A1 * | 1/2011 | Itou ...................... | H01H 13/705 |
| | | | 200/341 |

(Continued)

FOREIGN PATENT DOCUMENTS

CN            217567399 U   * 10/2022

OTHER PUBLICATIONS

ESPACE translation of CN217567399U (Year: 2025).*

*Primary Examiner* — David L Lewis
*Assistant Examiner* — Shauna-Kay N. Hall
(74) *Attorney, Agent, or Firm* — Daniel M. Cohn; Howard M. Cohn

(57) ABSTRACT

A button module and a game controller with the button module include a circuit board, a conductive adhesive, at least one switch and a rotating component. A first button circuit and a second button circuit are arranged in parallel on the circuit board. When the first button circuit or the second button circuit is closed, a corresponding control signal is generated and output. The conductive adhesive is arranged on the circuit board and faces the first button circuit. The switch is provided on the circuit board and faces the second button circuit. The rotating component is connected to the circuit board. When the rotating component rotates, the circuit board is driven to rotate until each button contact on the conductive adhesive faces the bottom end of the button on the game controller, or the switch faces the bottom end of the button on the game controller.

16 Claims, 24 Drawing Sheets

10

(56)                    References Cited

U.S. PATENT DOCUMENTS

| | | | |
|---|---|---|---|
| 2011/0111853 A1* | 5/2011 | Mitchell | G07F 17/32 |
| | | | 463/37 |
| 2013/0143665 A1* | 6/2013 | Taniguchi | G07F 17/3209 |
| | | | 463/37 |
| 2014/0378227 A1* | 12/2014 | Lee | H01H 21/36 |
| | | | 463/37 |
| 2015/0306495 A1* | 10/2015 | Lee | A63F 13/24 |
| | | | 463/37 |
| 2019/0157022 A1* | 5/2019 | Geng | H01H 3/12 |
| 2025/0153039 A1* | 5/2025 | Yang | A63F 13/24 |

* cited by examiner

10

10

14612

14611

14612

10

10

BUTTON MODULE AND GAME CONTROLLER WITH THE BUTTON MODULE

TECHNICAL FIELD

The present disclosure relates to a technical field of controller button, and in particular to a button module and game controller with the button module.

BACKGROUND

There are currently two ways to implement the buttons on game controllers on the market: conventional conductive silicone buttons and switch buttons. The above two types of controller buttons have their own advantages and disadvantages: conductive adhesive buttons have a good hand feel, are silent, and rebound quickly, but the consistency during production is not good, and the strength varies greatly, with a relatively large range of differences; the switch button has good force consistency and a lifespan of up to 5 million times. It is relatively long compared to conductive adhesive, but the button stroke is short, the sound is crisp, and the feel is not good.

The existing game controllers usually use one of the button modes, which makes it difficult for users to experience buttons with different tactile sensations on a single game controller. For users who pursue different tactile experiences, they need to purchase game controllers with different button modes to experience it, which is expensive.

SUMMARY

In order to solve the problem of poor tactile experience caused by a single button mode in existing game controllers, the present disclosure provides a button module and game controller with the button module.

Firstly, the present disclosure the button module, comprising: a circuit board, a conductive adhesive, at least one switch and a rotating component.

A first button circuit and a second button circuit are arranged in parallel on the circuit board, when the first button circuit or the second button circuit is closed, a corresponding control signal is generated and output; the conductive adhesive is arranged on the circuit board and faces the first button circuit, the conductive adhesive comprises at least one button contact, and when the button contact is pressed, the first button circuit is closed; the at least one switch is provided on the circuit board and faces the second button circuit, when the switch is pressed, the second button circuit is closed; the rotating component is connected to the circuit board, when the rotating component rotates, the circuit board is driven to rotate until each button contact on the conductive adhesive faces the bottom end of one button on the game controller, or each switch faces the bottom end of one button on the game controller.

Secondly, the present disclosure a game controller, comprising: a casing, a left joystick assembly, a right joystick assembly, a direction button assembly and a function button assembly, wherein the function button assembly includes a plurality of function buttons and the button module, the function buttons are arranged in button holes of preset function buttons on the casing, the button module, comprising: the circuit board, the conductive adhesive, the at least one switch and the rotating component; the number of button contacts and the number of switches on the conductive adhesive are equal to the number of function buttons;

the button module is arranged in the casing and faces the bottom end of the function button; when the rotating component rotates, the circuit board is driven to rotate until each button contact on the conductive adhesive faces the bottom end of one function button, or each switch faces the bottom end of one function button.

Thirdly, the present disclosure a game controller, comprising: the casing, the left joystick assembly, the right joystick assembly, the direction button assembly and the function button assembly, wherein direction button assembly includes the direction button, a button bracket and the button module; the button bracket is arranged in the casing and connected to the inner surface of the casing, the direction buttons are arranged on the button bracket and pass through the button holes of the preset direction buttons on the casing, the direction button includes at least four button parts; the button module, comprising: the circuit board, the conductive adhesive, the at least one switch and the rotating component; the number of button contacts and the number of switches on the conductive adhesive are equal to the number of the button parts, the button module is arranged in the casing and faces the bottom end of the direction button, when the rotating component rotates, the circuit board is driven to rotate until each button contact on the conductive adhesive faces the bottom end of one button part, or each switch faces the bottom end of one button part.

Compared to existing technology, the button module of the present disclosure is equipped with a rotating component, two button circuits are set on the circuit board, and then the circuit board is set on the rotating component, then, place the conductive adhesive and switch on the circuit board, corresponding to a button circuit, and rotate the component to drive the circuit board to rotate, the circuit board rotates so that the button contacts of the conductive adhesive are facing the bottom of a button on the game controller, or so that each switch is facing the bottom of a button on the game controller, thus achieving mutual switching between conductive adhesive button mode and switch button mode, allowing users to experience two different tactile button modes through a game controller, without the need to purchase game controllers with different button modes separately, reduces user expenses and improves the user experience.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
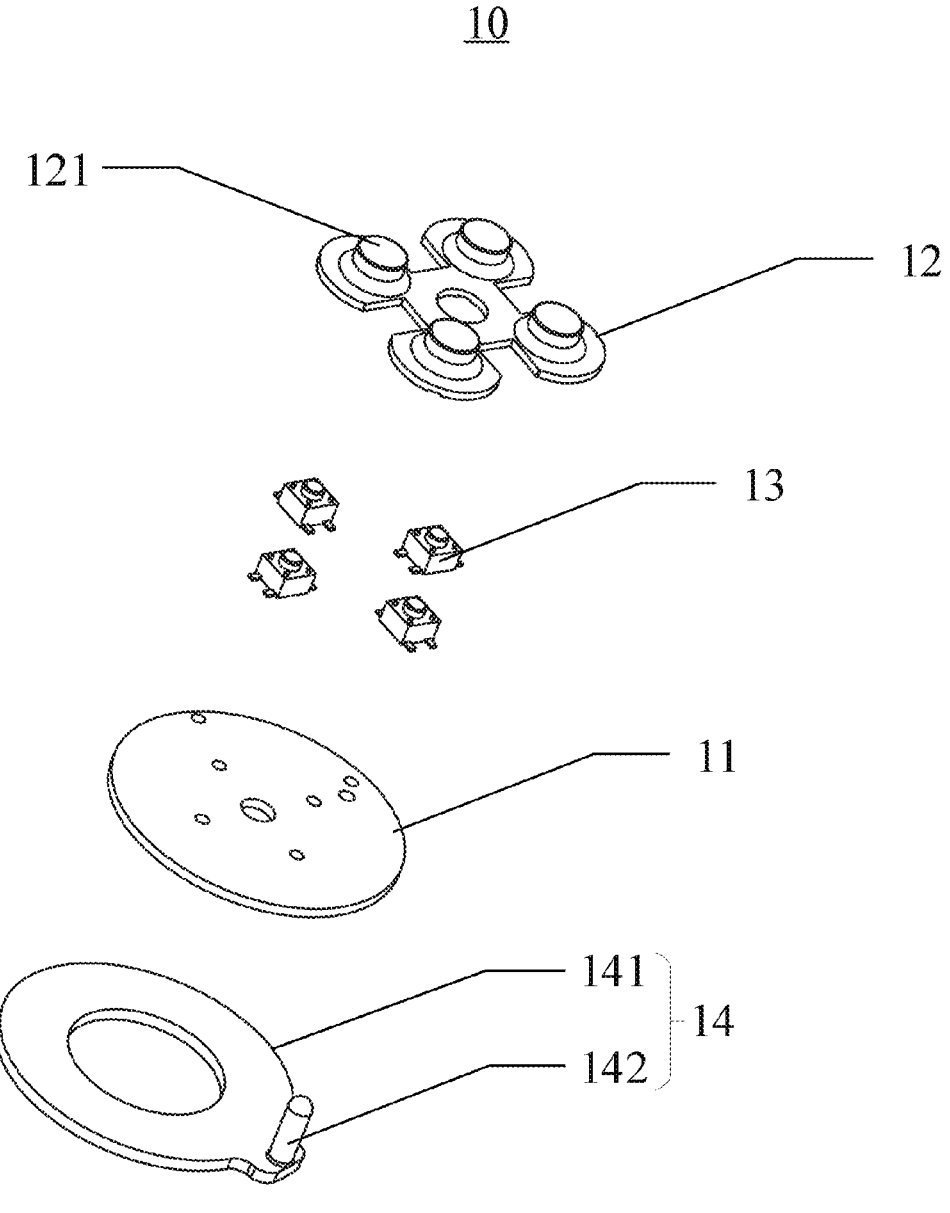
FIG. 1 is a schematic diagram of the structure of the first button module embodiment.

| Reference number in the drawings: | | | |
|---|---|---|---|
| casing | 1 | left joystick assembly | 2 |
| right joystick assembly | 3 | direction button assembly | 4 |
| function button assembly | 5 | button module | 10 |
| circuit board | 11 | conductive adhesive | 12 |
| switch | 13 | rotating component | 14 |
| button hole | 21 | silicone pad | 23 |
| first sliding slide | 22 | silicone bracket | 24 |
| second sliding slide | 25 | second through-hole | 26 |
| first installation hole | 27 | third through-hole | 28 |
| second limiting groove | 29 | direction button | 41 |
| button bracket | 42 | function button | 51 |
| first engaging hole | 111 | button contact | 121 |
| first turntable | 141 | toggle lever | 142 |
| second turntable | 143 | gear drive component | 144 |
| bracket | 145 | rotating shaft component | 146 |
| rotating connector | 147 | third turntable | 148 |
| electric drive component | 149 | drive switch | 150 |
| rotating disk | 151 | rotating cylinder | 152 |
| button protrusion | 231 | button part | 411 |
| first gear teeth | 1431 | driving part | 1441 |
| transmission part | 1442 | first support column | 1443 |
| second support column | 1444 | third support column | 1445 |
| fourth support column | 1446 | fifth support column | 1447 |
| sixth support column | 1448 | groove | 1451 |
| rotating shaft | 1461 | base | 1462 |
| connecting rod | 1471 | first support rod | 1472 |
| second support rod | 1473 | second gear teeth | 1481 |
| motor | 1491 | motor bracket | 1492 |
| output end | 1493 | third gear | 14411 |
| fourth gear | 14412 | first rack | 14413 |
| first crossbar | 14414 | second rack | 14415 |
| second crossbar | 14416 | fifth gear | 14421 |
| sixth gear | 14422 | fourth secondary gear | 14423 |
| second intermediate gear | 14424 | first limiting groove | 14611 |

-continued

| Reference number in the drawings: | | | |
|---|---|---|---|
| positioning hole | 14612 | second engaging hole | 14621 |
| positioning column | 14622 | first limiting column | 14623 |
| second limiting column | 14624 | second drive gear | 14931 |
| transmission gear | 14932 | seventh gear | 144231 |
| eighth gear | 144232 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

The present disclosure the button module, comprising: a circuit board, a conductive adhesive, the at least one switch and a rotating component; a first button circuit and a second button circuit are arranged in parallel on the circuit board, when the first button circuit or the second button circuit is closed, a corresponding control signal is generated and output; the conductive adhesive is arranged on the circuit board and faces the first button circuit, the conductive adhesive comprises at least one button contact, and when the button contact is pressed, the first button circuit is closed; the number of button contacts is set according to actual needs. For example, for directional buttons, they have four button positions, so four corresponding button contacts need to be set on the corresponding conductive adhesive; the at least one switch is provided on the circuit board and faces the second button circuit, when the switch is pressed, the second button circuit is closed; the number of switches also needs to be set according to actual needs, and for direction buttons, four switches need to be set as well; the rotating component is connected to the circuit board, when the rotating component rotates, the circuit board is driven to rotate until each button contact on the conductive adhesive faces the bottom end of one button on the game controller, or each switch faces the bottom end of one button on the game controller.

Specifically, by rotating the rotating component, the rotating component drives the circuit board to rotate, when the circuit board is rotated to a preset angle, each button contact on the conductive adhesive are facing the bottom of one button on the game controller. When the buttons are pressed, the corresponding buttons on the conductive adhesive are exposed to the first button circuit on the circuit board. And when the circuit board rotates to another preset angle, each switch is the bottom of a button on the game controller. When the buttons are pressed, the switch is in contact with the second button circuit on the circuit board, the second button circuit is turned on, and the function of the button to output the game controller.

The button module of the present disclosure is set to set up two button circuits on the circuit board by setting up the rotating component, then set the circuit board on the rotating component, and then set the conductive adhesive and the switch to the circuit board and correspond to a button circuit. By rotating the rotating component to rotate the circuit board, the circuit board rotation makes the buttons of the conductive adhesive facing the position of the bottom end of a button on the game controller, or make each switch facing the bottom end of a button on the game controller. Therefore, the conductive adhesive button mode and the switch button mode are switched to each other. There is no need to buy gamepads with different button modes respectively, reducing the cost of user overhead and making the user experience better.

FIG. 1 shows the structural diagram of the first embodiment of the button module. Referring to FIG. 1, the button module 10, comprising: a circuit board 11, a conductive adhesive 12, at least one switch 13 and a rotating component 14; a first button circuit and a second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes a first turntable 141 and a toggle lever 142, and the toggle lever 142 is disposed at the edge of the first turntable 141, the toggle lever 142 drives the first turntable 141 to rotate under the action of external force, and the circuit board 11 is arranged on the first turntable 141, when the toggle lever 142 is moved, the first turntable 141 is driven to rotate, the first turntable 141 drives the circuit board 11 to rotate until each button contact 121 on the conductive adhesive 12 faces the bottom end of one button on the game controller, or each switch 13 faces the bottom end of one button on the game controller.

Specifically, set the circuit board 11 on the first turntable 141, set the conductive adhesive 12 and the switch 13 on the circuit board 11, and drive the first turntable 141 to rotate by dialing the toggle lever 142. When the toggle lever 142 was pulled to the first preset angle, the first turntable 141 rotated to each button contact 121 on the conductive adhesive 12 is the position of the bottom end of the button on the game controller. At this time, when the buttons on the game controller are pressed, the corresponding buttons on the conductive adhesive 12 are pressed to contact the first button circuit, the first button circuit is connected, and the function of the button output of the game controller. When the toggle lever 142 was pulled to the second preset angle, the first turntable 141 rotated to the bottom of a button on the game controller of each switch 13, at this time, when the buttons on the game controller are pressed, the switch 13 is pressed to contact the second button circuit, the second button circuit is connected, and the function of the button of the game controller output.

In the embodiment, the button module 10 is set to set up two button circuits on the circuit board 11 by setting the first turntable 141 and the toggle lever 142. Then set the circuit board 11 to the first turntable 141, and then set the conductive adhesive 12 and the switch 13 on the circuit board 11 and correspond to a button circuit. The toggle lever 142 is moved, the first turntable 141 is driven to rotate, the first turntable 141 drives the circuit board 11 to rotate until each button contact 121 on the conductive adhesive 12 faces the bottom end of one button on the game controller, or each switch 13 faces the bottom end of one button on the game controller. Therefore, the conductive adhesive button mode and the switch button mode are switched to each other. There is no need to buy game controllers with different button modes respectively, reducing the cost of user overhead and making the user experience better.

Figure 2:
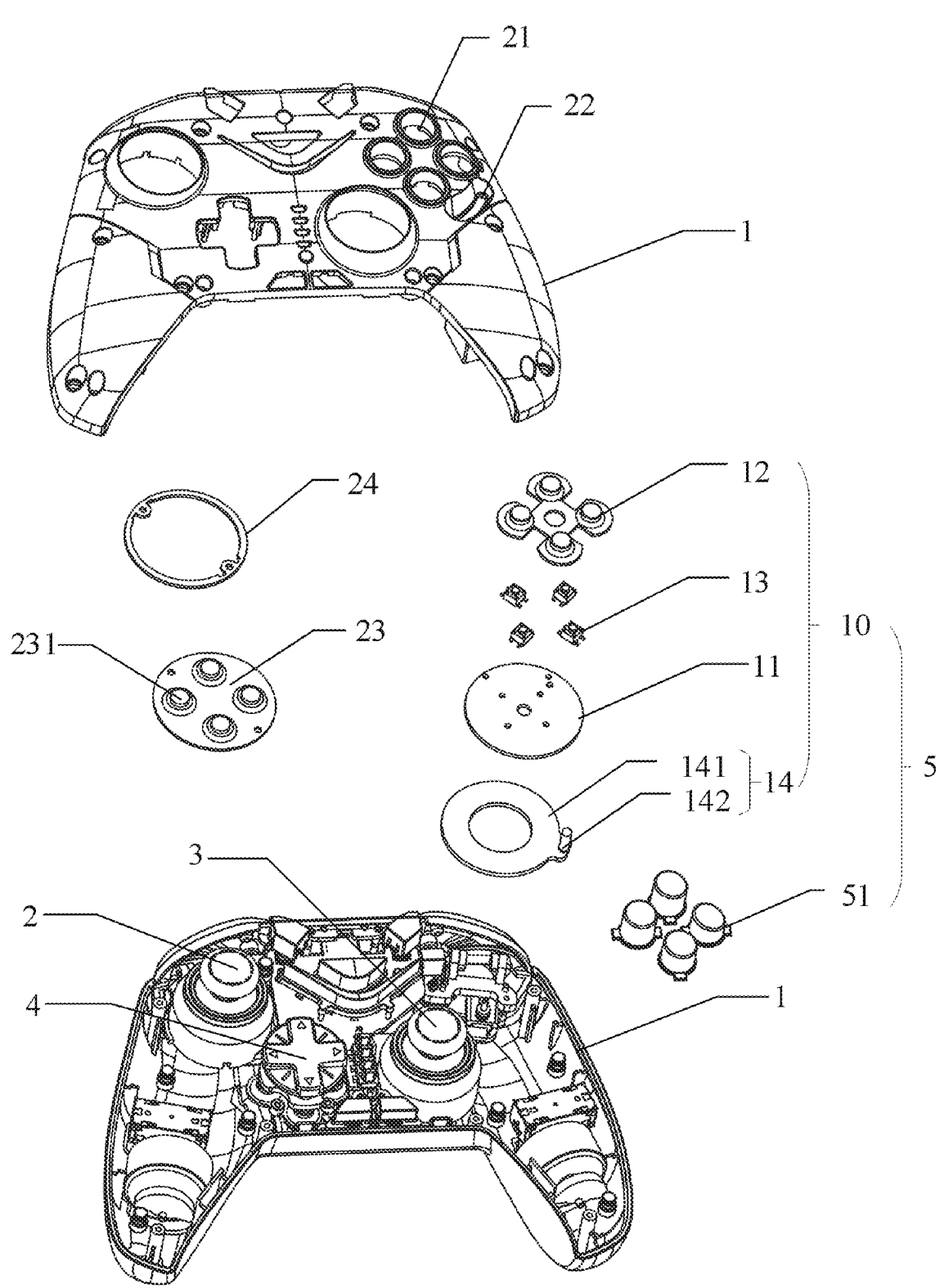
FIG. 2 is a schematic diagram of the structure of the first game controller embodiment.

FIG. 2 shows the structural diagram of the first embodiment of the game controller. Referring to FIG. 2, the game controller, comprising: a casing 1, a left joystick assembly 2, a right joystick assembly 3, a direction button assembly 4 and a function button assembly 5, the function button assembly 5 includes multiple function buttons 51 and the button module 10 as described in the first button module embodiment. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. Wherein the rotating component 14 includes the first turntable 141 and the toggle lever 142, and the toggle lever 142 is disposed at the edge of the first turntable 141, the toggle lever 142 drives the first turntable 141 to rotate under the action of external force, and the circuit board 11 is arranged on the first turntable 141. The casing 1 is close to the function buttons 51 settings with a first sliding slide 22, and the toggle lever 142 passes through the first sliding slide 22 to extend to the outside of the casing 1.

Specifically, when the toggle lever 142 was pulled to the first preset angle, the first turntable 141 rotated to each button contact 121 on the conductive adhesive 12 is the position of the bottom end of one function button 51. When the toggle lever 142 was pulled to the second preset angle, the first turntable 141 rotated to each switch 13 is the position of the bottom end of one function button 51.

Furthermore, the first sliding slide 22 is arc-shaped, and when one endpoint of the first sliding slide 22 corresponds to the first preset angle, the other endpoint corresponds to the second preset angle. By setting the first sliding slide 22 to the curved shape to match the rotating trajectory of the toggle lever 142, it is convenient to mobilize the toggle lever 142. And by one endpoint of the first sliding slide 22 corresponding to the first preset angle, the other endpoint corresponds to the second preset angle. When switching the button mode, the user only needs to mobilize the toggle lever 142 to the endpoint position of the first sliding slide 22, which is convenient for the user to quickly complete the switching of the button mode.

Furthermore, referring to FIG. 2, the game controller also includes a silicone pad 23 and a silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or switch 13 and the button circuit due to insufficient pressing distance.

The game controller of this embodiment can quickly switch the button mode of the function buttons 51 by setting the button module 10 below the function buttons 51, meeting the user's needs for different button modes of the function buttons 51. By allowing users to experience two different touch button modes through a single game controller, there is no need to purchase game controllers with different button modes separately, reducing user expenses and providing a better user experience.

Figure 3:
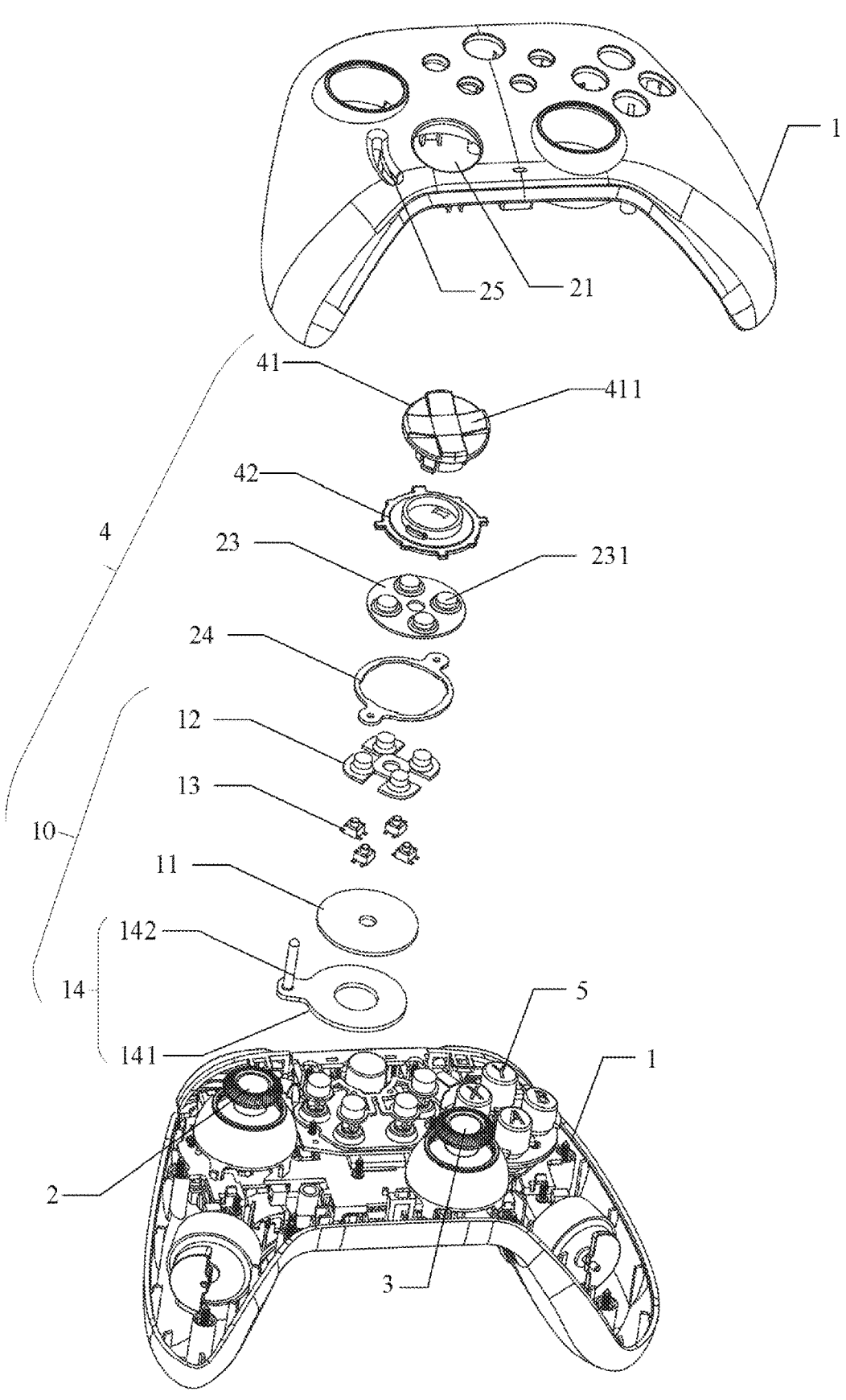
FIG. 3 is a schematic diagram of the structure of the second game controller embodiment.

FIG. 3 shows the structural diagram of the second game controller embodiment. Referring to FIG. 3, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the first button module embodiment. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the first turntable 141 and the toggle lever 142, which is set at the edge of the first turntable 141. The toggle lever 142 drives the first turntable 141 to rotate under external force. The circuit board 11 is located on the first turntable 141, and a second sliding slide 25 is set near the direction button 41 on the casing 1. The toggle lever 142 extends through the second sliding slide 25 to the outside of the casing 1.

Specifically, when the toggle lever 142 is moved to the first preset angle, the first turntable 141 rotates to the position where each button contact 121 on the conductive adhesive 12 is facing the bottom end of one button part 411. When the toggle lever 142 is moved to the second preset angle, the first turntable 141 rotates to the position where each switch 13 is facing the bottom end of one button part 411.

Furthermore, the second sliding slide 25 is arc-shaped, and when one endpoint of the second sliding slide 25 corresponds to the first preset angle, the other endpoint corresponds to the second preset angle. By setting the second sliding slide 25 to the curved shape to match the rotating trajectory of the toggle lever 142, it is convenient to mobilize the toggle lever 142. And by one endpoint of the second sliding slide 25 corresponding to the first preset angle, the other endpoint corresponds to the second preset angle. When switching the button mode, the user only needs to mobilize the toggle lever 142 to the endpoint position of the second sliding slide 25, which is convenient for the user to quickly complete the switching of the button mode.

Furthermore, referring to FIG. 3, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 4:
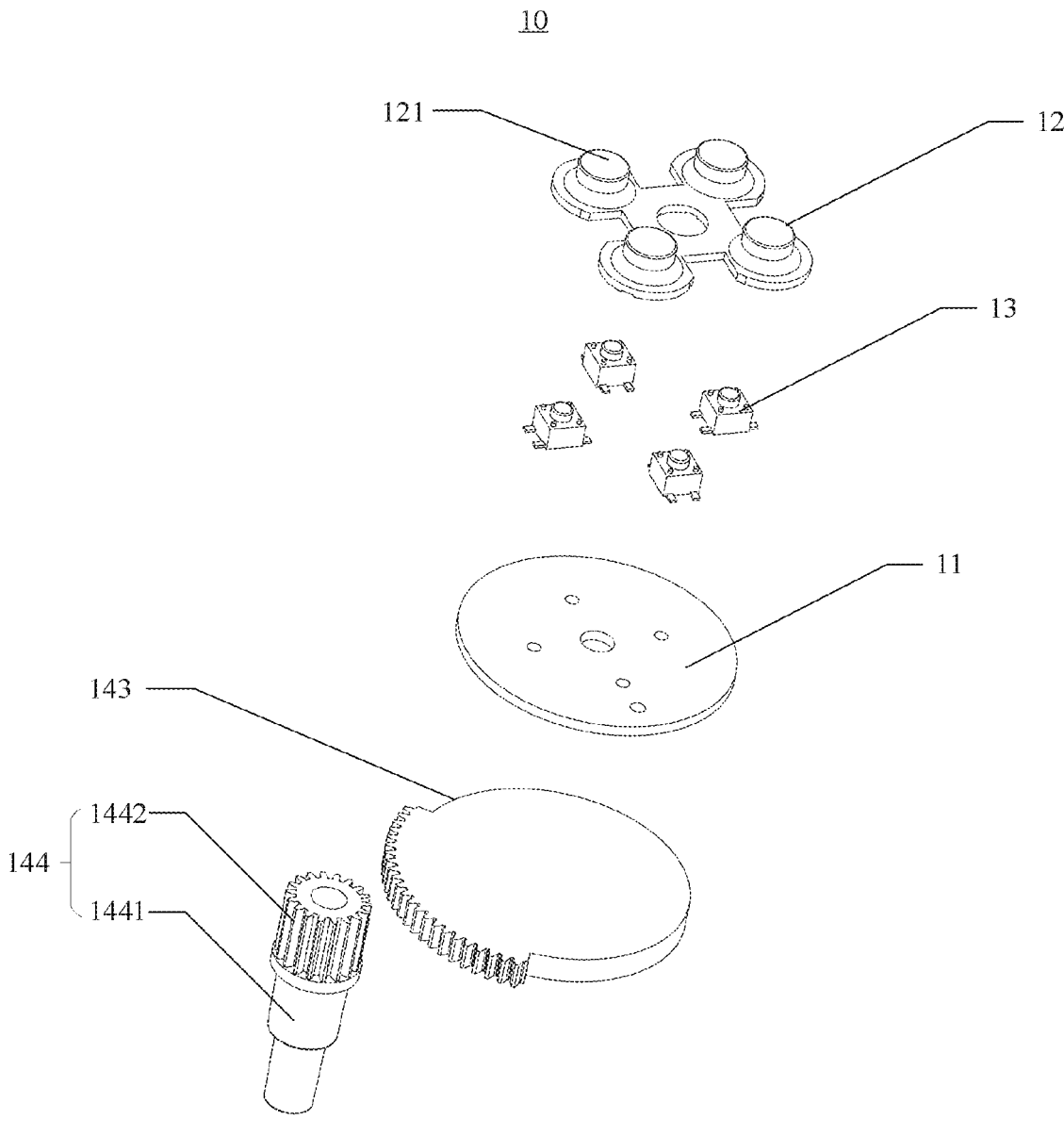
FIG. 4 is a schematic diagram of the structure of the second button module embodiment.

FIG. 4 shows the structural diagram of the second button module embodiment. Referring to FIG. 4, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431, when the driving part 1441 is driven, the transmission part 1442 is driven to rotate; the transmission part 1442 drives the second turntable 143 to rotate; the rotation of the second turntable 143 drives the circuit board 11 to rotate until each button contact on the conductive adhesive 12 faces the bottom end of one button on the game controller, or each switch 13 faces the bottom end of one button on the game controller. The driving part 1441 includes a driving shaft, and the transmission part 1442 includes a first driving gear. The first driving gear is set at the top of the driving shaft and meshes with the first gear teeth 1431. There is a slot at the bottom of the driving shaft (not shown in the figure), and when the driving shaft is rotated, the first driving gear drives the second turntable 143 to rotate.

Specifically, the tool is inserted into the slot at the bottom of the driving shaft, and the rotating tool can drive the driving shaft to rotate. The rotation of the driving shaft can drive the first driving gear to rotate, and the first driving gear rotates to drive the second turntable 143 to rotate, thereby achieving the switching of two button modes. Among them, the slot is preferably the "one" slot, and the user can enter the "one" slot to rotate the axle through the screwdriver card of the "one" rising head.

Figure 5:
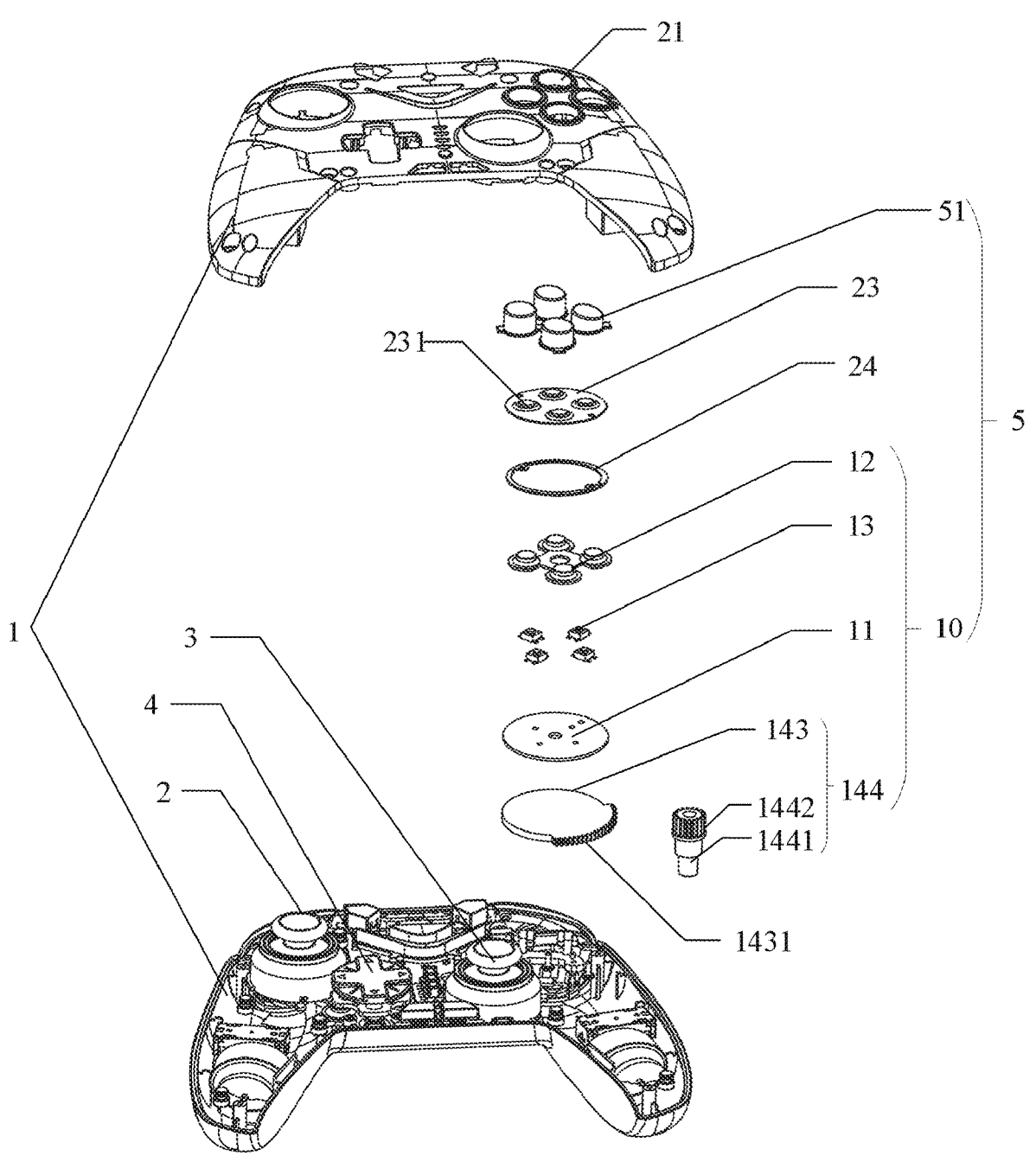
FIG. 5 is a schematic diagram of the structure of the third game controller embodiment.

FIG. 5 shows the structural diagram of the third game controller embodiment. Referring to FIG. 5, the game controller, comprising: the casing 1, the left joystick assembly 2, the right joystick assembly 3, the direction button assembly 4 and the function button assembly 5, the function button assembly 5 includes multiple function buttons 51 and the button module 10 as described in the second button module embodiment. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. The rotating component 14 includes a second turntable 143 and a gear drive component 144, and the circuit board 11 is disposed on the second turntable 143, the first gear teeth 1431 of a first preset length is provided on the edge of the second turntable 143, the gear drive component 144 includes the driving part 1441 and the transmission part 1442, the transmission part 1442 meshes with the first gear teeth 1431.

A first through-hole (not shown in the figure) is provided near the function button 51 on the casing 1, and the driving part 1441 extends from the first through-hole to the outside of the casing 1. The driving part 1441 includes the driving shaft, and the transmission part 1442 includes the first driving gear. The bottom end of the driving shaft extends from the first through-hole to the outside of casing 1. The first driving gear is set at the top of the driving shaft and meshes with the first gear teeth 1431. There is a slot at the bottom of the driving shaft, and when the driving shaft is rotated, the first driving gear drives the second turntable 143 to rotate.

Specifically, by using a tool to insert it into the slot at the bottom of the driving shaft, the rotating tool can drive the driving shaft to rotate. The rotation of the driving shaft can drive the first driving gear to rotate. The first driving gear rotates to drive the second turntable 143 to rotate. The second turntable 143 drives the circuit board 11 to rotate until each button contact 121 on the conductive adhesive 12 is facing the bottom end of one button part 411, or each switch 13 is facing the bottom end of one button part 411.

Furthermore, referring to FIG. 5, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 6:
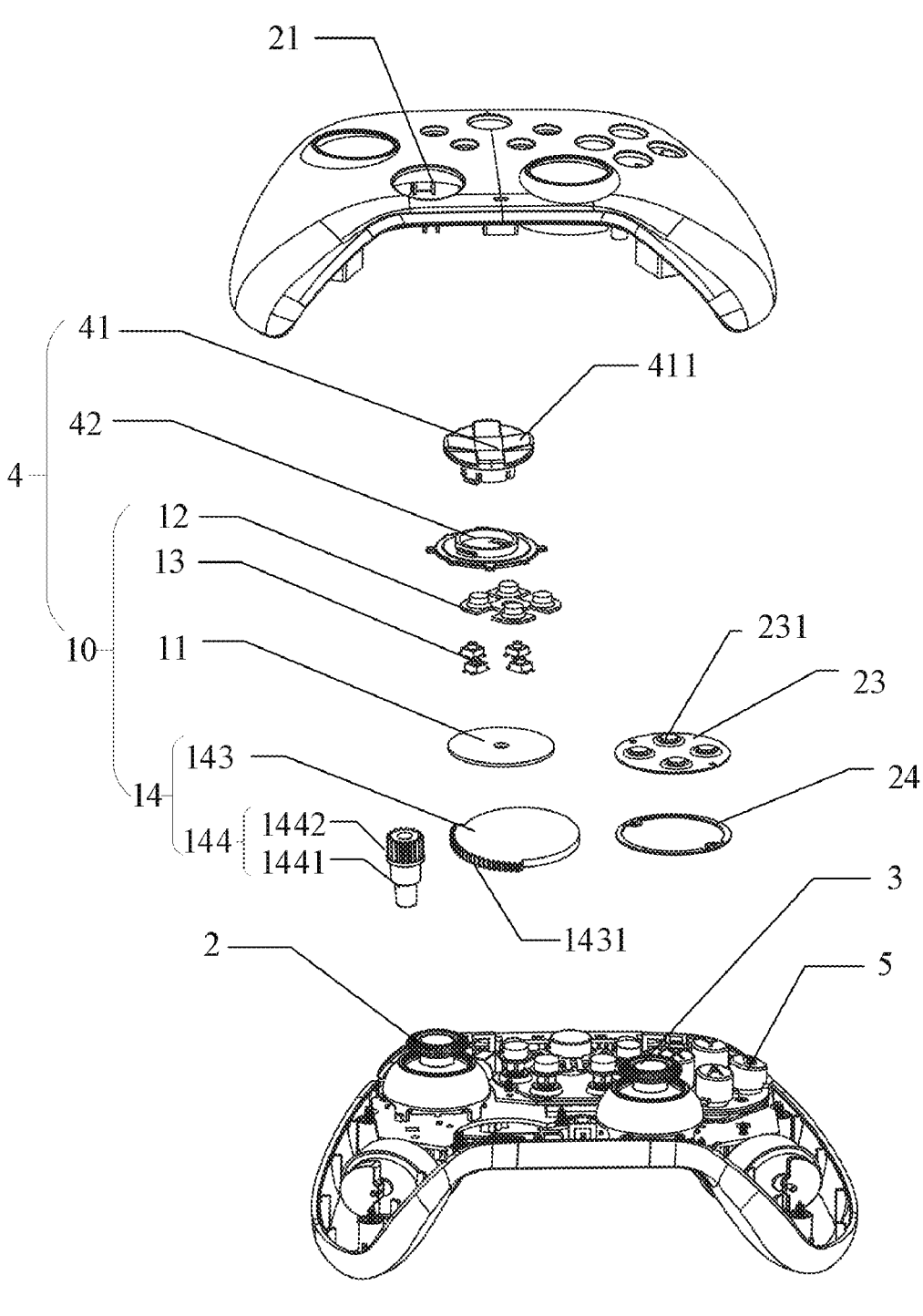
FIG. 6 is a schematic diagram of the structure of the fourth game controller embodiment.

FIG. 6 shows the structural diagram of the fourth game controller embodiment. Referring to FIG. 6, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the second button module embodiment. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the first turntable 141 and the toggle lever 142, which is set at the edge of the first turntable 141. The toggle lever 142 drives the first turntable 141 to rotate under external force. The circuit board 11 is located on the first turntable 141, and a second sliding slide 25 is set near the direction button 41 on the casing 1. The toggle lever 142 extends through the second sliding slide 25 to the outside of the casing 1. Among them, the rotating component 14 includes the second turntable 143 and the gear drive component 144. The circuit board 11 is set on the second turntable 143, and the first gear teeth 1431 of the first preset length is set at the edge of the second turntable 143. The gear drive component 144 includes the driving part 1441 and the transmission part 1442, and the transmission part 1442 meshes with the first gear teeth 1431. A third through-hole is set near the direction button 41 on the casing 1 (not shown in the figure), the driving part 1441 extends from the third through-hole to the outside of the casing 1. Among them, the driving part 1441 includes the driving shaft, and the bottom end of the driving shaft extends from the third through-hole to the outside of the casing 1. The driving part 1442 includes the first driving gear, which is set at the top of the driving shaft and meshes with the first gear 1431. The bottom end of the driving shaft is provided with the slot, and when the driving shaft is rotated, the first driving gear drives the second turntable 143 to rotate.

Specifically, the tool is inserted into the slot at the bottom of the driving shaft, and the rotating tool can drive the driving shaft to rotate. The rotation of the driving shaft can drive the first driving gear to rotate, and the first driving gear rotates to drive the second turntable 143 to rotate, thereby achieving the switching of two button modes. Among them, the slot is preferably the "one" slot, and the user can enter the "one" slot to rotate the axle through the screwdriver card of the "one" rising head.

Furthermore, referring to FIG. 6, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 7:
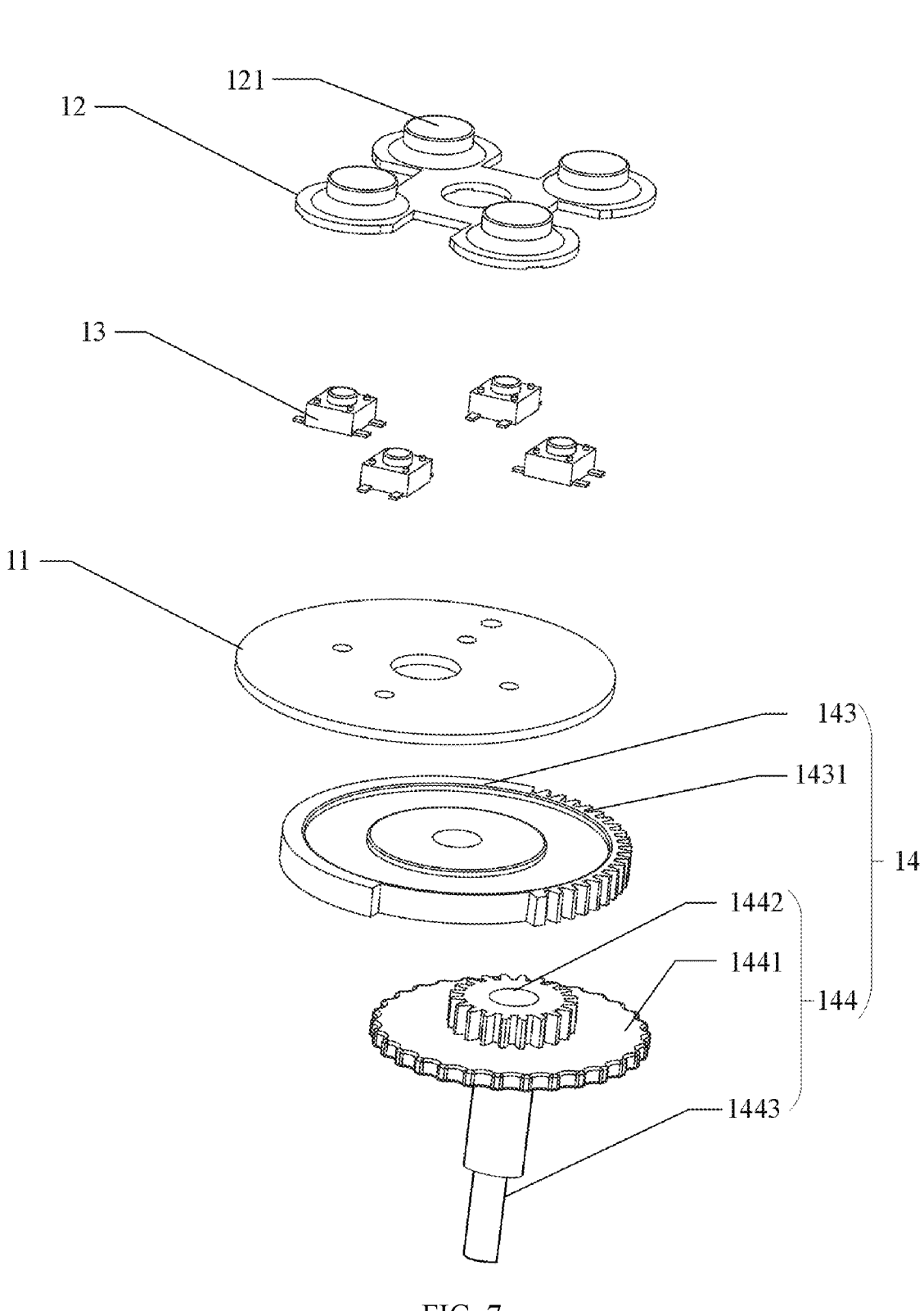
FIG. 7 is a schematic diagram of the structure of the third button module embodiment.

FIG. 7 shows the structural diagram of the third button module embodiment. Referring to FIG. 7, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431, when the driving part 1441 is driven, the transmission part 1442 is driven to rotate; the transmission part 1442 drives the second turntable 143 to rotate; the rotation of the second turntable 143 drives the circuit board 11 to rotate until each button contact on the conductive adhesive 12 faces the bottom end of one button on the game controller, or each switch 13 faces the bottom end of one button on the game controller. Wherein the gear drive component 144 also includes a first support column 1443, the driving part 1441 includes a first gear, and the transmission part 1442 includes a second gear, the first gear and the second gear constitute a first secondary gear, the first secondary gear is movably arranged on the first support column 1443, and the second gear meshes with the first gear teeth 1431, when the first gear is rotated, the second gear drives the second turntable 143 to rotate.

Specifically, by driving the first gear to rotate, the first gear drives the second gear to rotate, and the second gear drives the second turntable 143 to rotate, thereby achieving mutual switching between the conductive adhesive button mode and the switch button mode.

Figure 8:
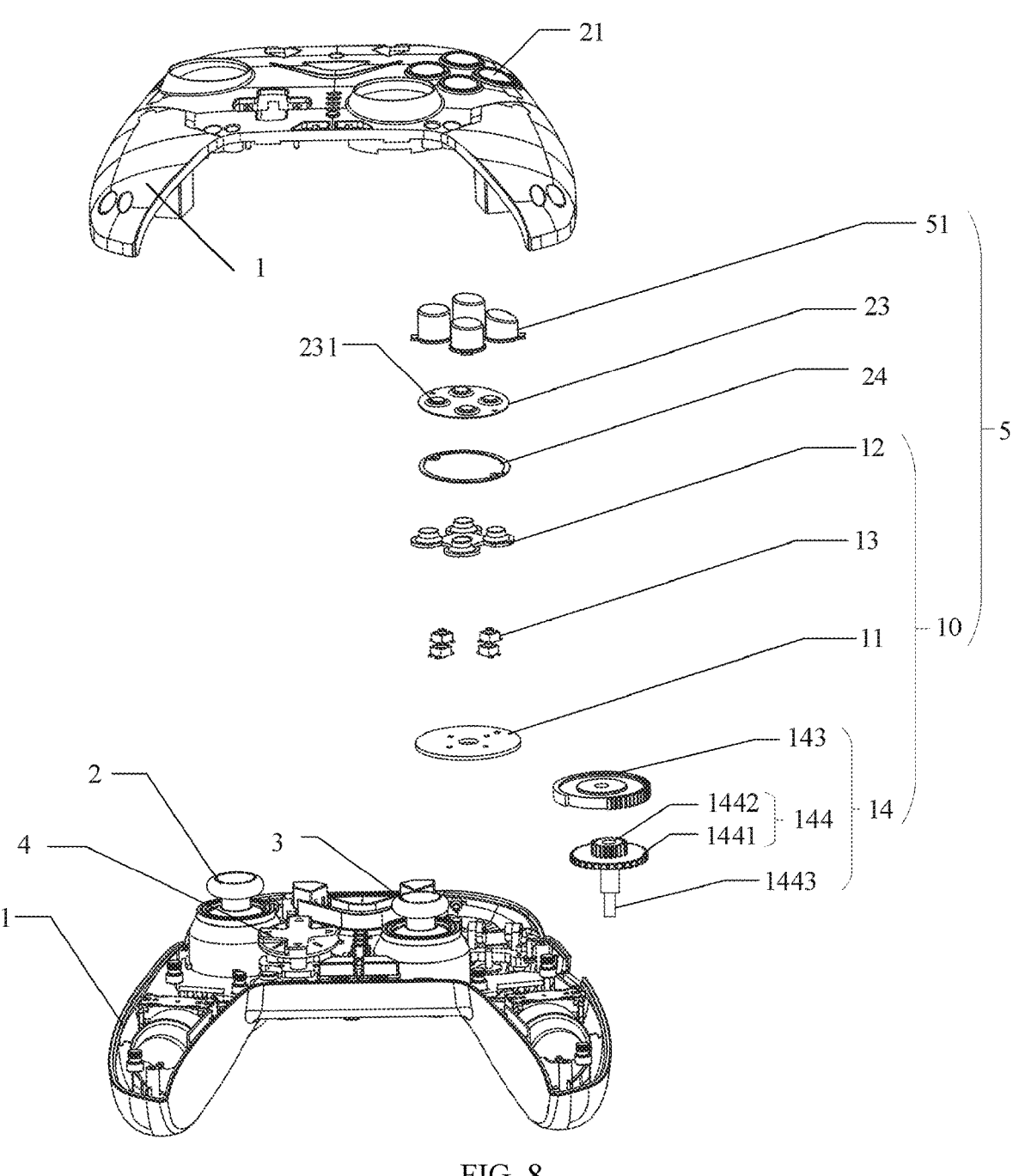
FIG. 8 is a schematic diagram of the structure of the fifth game controller embodiment.

FIG. 8 shows the structural diagram of the fifth game controller embodiment. Referring to FIG. 8, the game controller, comprising: the casing 1, the left joystick assembly 2, the right joystick assembly 3, the direction button assembly 4 and the function button assembly 5, the function button assembly 5 includes multiple function buttons 51 and the button module 10 as described in the third button module embodiment. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. The rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431. The first through-hole is provided near the function button 51 on the casing 1, and the driving part 1441 extends from the first through-hole to the outside of the casing 1. Wherein the gear drive component 144 also includes a first support column 1443, the driving part 1441 includes a first gear, and the transmission part 1442 includes a second gear, the first gear and the second gear constitute a first secondary gear, the first secondary gear is movably arranged on the first support column 1443, and the second gear meshes with the first gear teeth 1431, when the first gear is rotated, the second gear drives the second turntable 143 to rotate.

Specifically, by driving the first gear to rotate, the first gear drives the second gear to rotate, and the second gear drives the second turntable 143 to rotate, thereby achieving mutual switching between the conductive adhesive button mode and the switch button mode of the function button 51.

Furthermore, referring to FIG. 8, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 9:
FIG. 9 is a schematic diagram of the structure of the fourth button module embodiment.
Figure 9:
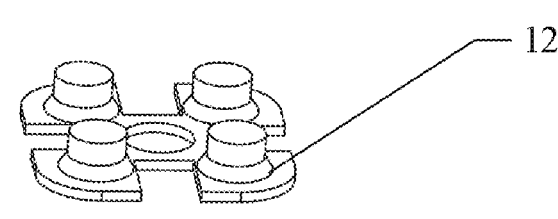
Figure 9:
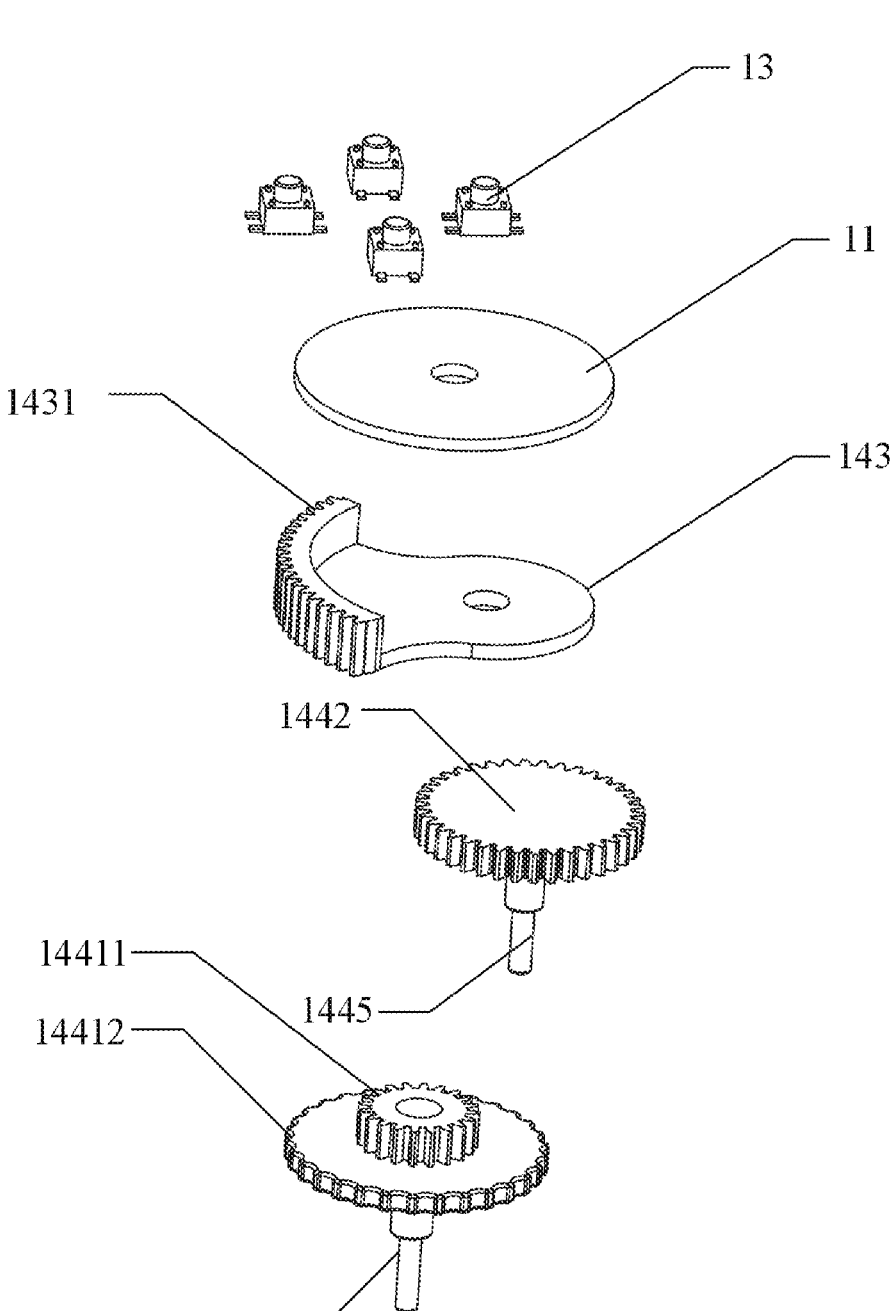

FIG. 9 shows the structural diagram of the fourth button module embodiment. Referring to FIG. 9, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431, when the driving part 1441 is driven, the transmission part 1442 is driven to rotate; the transmission part 1442 drives the second turntable 143 to rotate; the rotation of the second turntable 143 drives the circuit board 11 to rotate until each button contact on the conductive adhesive 12 faces the bottom end of one button on the game controller, or each switch 13 faces the bottom end of one button on the game controller, wherein the gear drive component 144 also includes a second support column 1444 and a third support column 1445, the driving part 1442 includes a second secondary gear, and the transmission part includes a first intermediate gear; the second secondary gear is movably sleeved on the second support column 1444, and the first intermediate gear is movably sleeved on the third support column 1445, the second secondary gear includes a third gear 14411 and a fourth gear 14412, the third gear 14411 meshes with the first intermediate gear, the first intermediate gear meshes with the first gear teeth 1431 of the first preset length; when the fourth gear 14412 is driven, the third gear 14411 drives the first intermediate gear to rotate, and the first intermediate gear drives the second turntable 143 to rotate.

Specifically, by driving the fourth gear 14412, the fourth gear 14412 drives the third gear 14411 to rotate, the third gear 14411 drives the first intermediate gear to rotate, and the first intermediate gear drives the second turntable 143 to rotate, thereby achieving mutual switching between the conductive adhesive button mode and the switch button mode.

Figure 10:
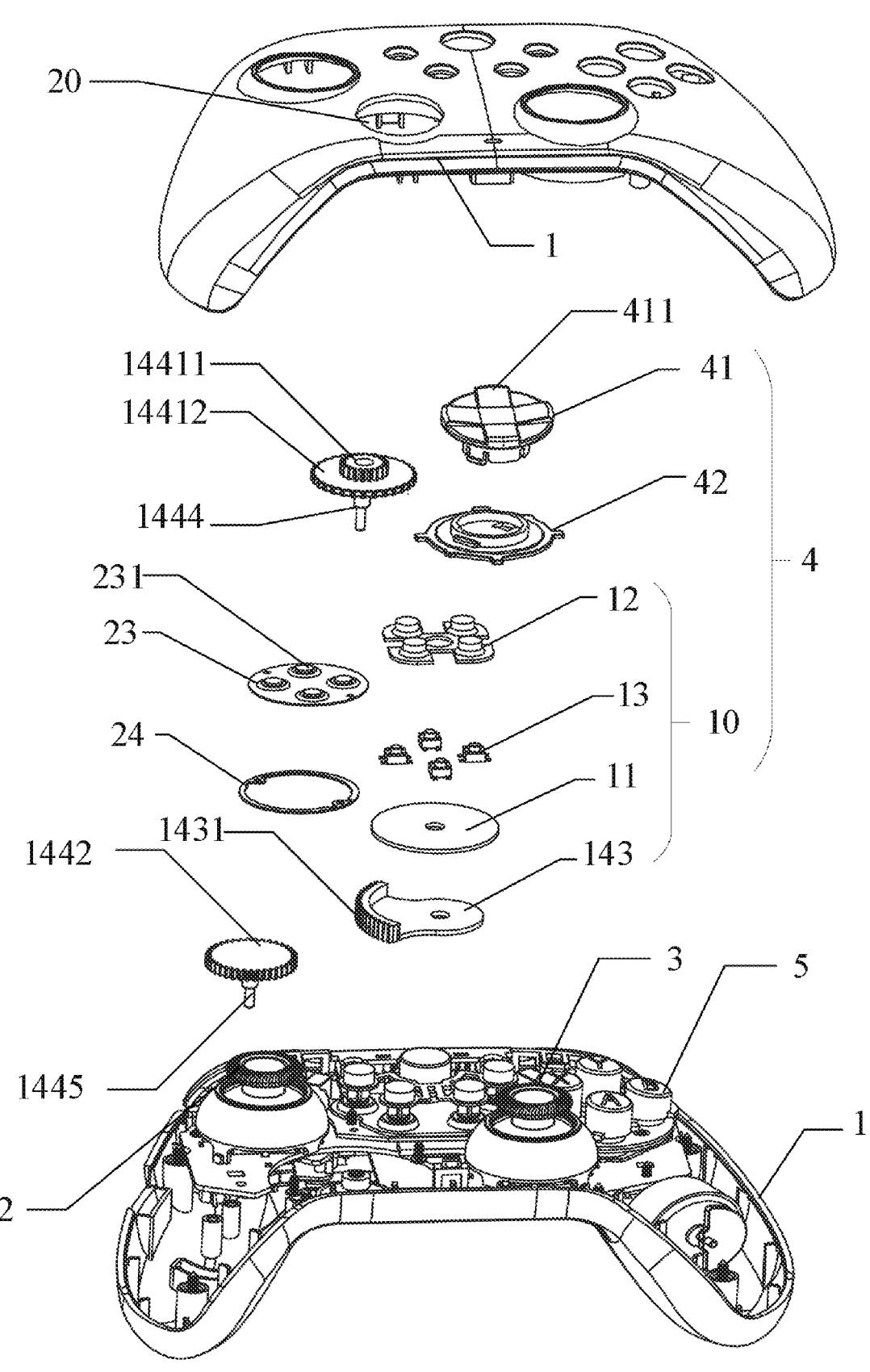
FIG. 10 is a schematic diagram of the structure of the sixth game controller embodiment.

FIG. 10 shows the structural diagram of the sixth game controller embodiment. Referring to FIG. 10, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the fourth button module embodiment. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the first turntable 141 and the toggle lever 142, which is set at the edge of the first turntable 141. The toggle lever 142 drives the first turntable 141 to rotate under external force. The circuit board 11 is located on the first turntable 141, and a second sliding slide 25 is set near the direction button 41 on the casing 1. The toggle lever 142 extends through the second sliding slide 25 to the outside of the casing 1. Among them, the rotating component 14 includes the second turntable 143 and the gear drive component 144. The circuit board 11 is set on the second turntable 143, and the first gear teeth 1431 of the first preset length is set at the edge of the second turntable 143. The gear drive component 144 includes the driving part 1441 and the transmission part 1442, and the transmission part 1442 meshes with the first gear teeth 1431. A third through-hole is set near the direction button 41 on the casing 1, the driving part 1441 extends from the third through-hole to the outside of the casing 1, wherein the gear drive component 144 also includes a second support column 1444 and a third support column 1445, the driving part 1442 includes a second secondary gear, and the transmission part includes a first intermediate gear; the second secondary gear is movably sleeved on the second support column 1444, and the first intermediate gear is movably sleeved on the third support column 1445, the second secondary gear includes a third gear 14411 and a fourth gear 14412, the third gear 14411 meshes with the first intermediate gear, the first intermediate gear meshes with the first gear teeth 1431 of the first preset length; part of the edge teeth of the fourth gear 14412 extend from the third through-hole to the outside of casing 1, when the fourth gear 14412 is driven, the third gear 14411 drives the first intermediate gear to rotate, and the first intermediate gear drives the second turntable 143 to rotate.

Specifically, by driving the fourth gear 14412, the fourth gear 14412 drives the third gear 14411 to rotate, the third gear 14411 drives the first intermediate gear to rotate, and the first intermediate gear drives the second turntable 143 to rotate, thereby achieving mutual switching between the conductive adhesive button mode and the switch button mode of the direction button 41.

Furthermore, referring to FIG. 10, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 11:
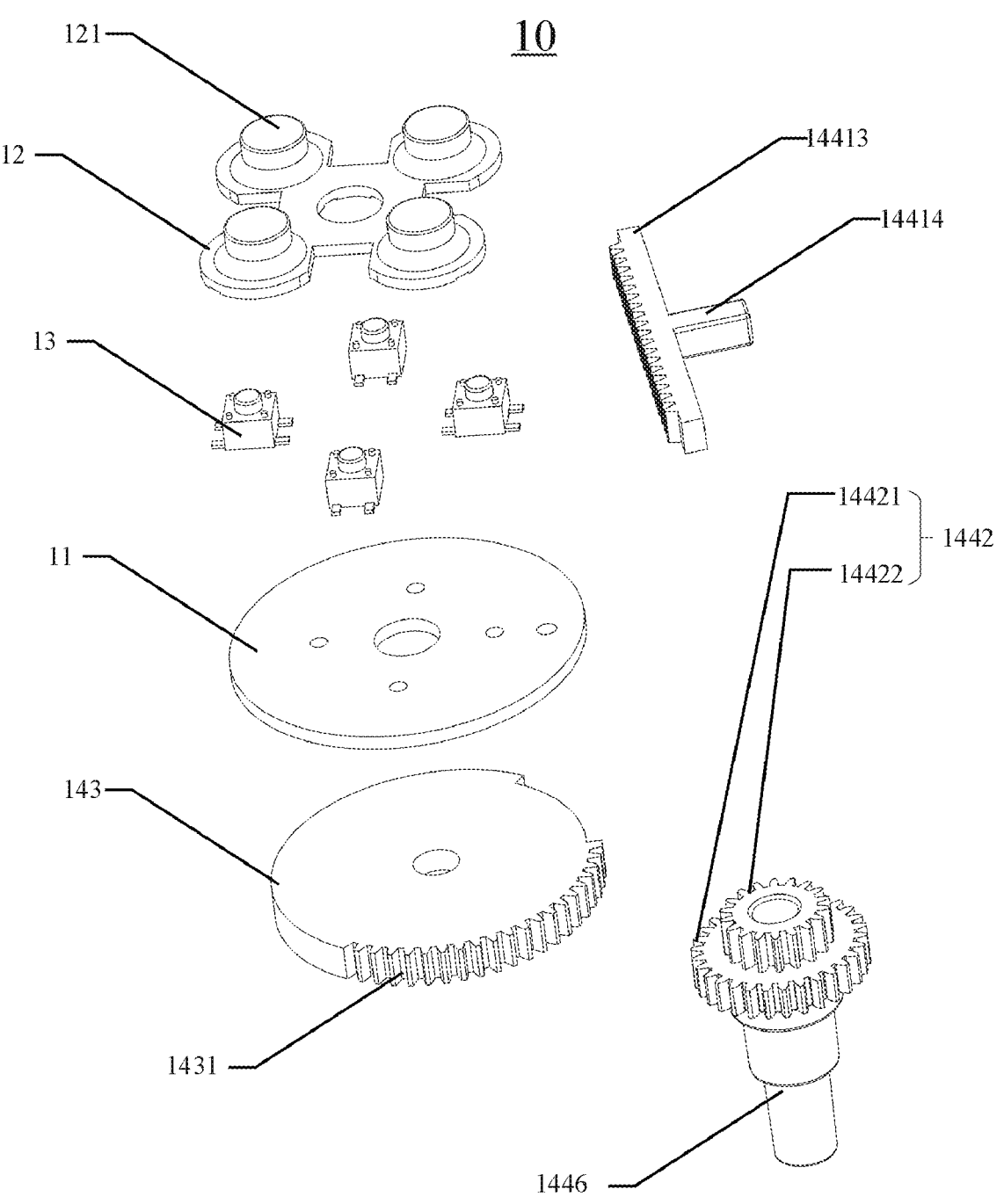
FIG. 11 is a schematic diagram of the structure of the fifth button module embodiment.

FIG. 11 shows the structural diagram of the fifth button module embodiment. Referring to FIG. 11, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431, when the driving part 1441 is driven, the transmission part 1442 is driven to rotate; the transmission part 1442 drives the second turntable 143 to rotate; the rotation of the second turntable 143 drives the circuit board 11 to rotate until each button contact on the conductive adhesive 12 faces the bottom end of one button on the game controller, or each switch 13 faces the bottom end of one button on the game controller, wherein the gear drive component 144 further includes a fourth support column 1446, and the driving part 1441 includes a first rack 14413, the transmission part 1442 includes a third secondary gear, and the third secondary gear is movably sleeved on the fourth support column 1446, the third secondary gear includes a fifth gear 14421 and a sixth gear 14422, the fifth gear 14421 meshes with the first gear teeth 1431, the sixth gear 14422 meshes with the first rack 14413, and a first crossbar 14414 is provided on the first rack 14413, when the first crossbar 14414 is moved, the third secondary gear is driven to rotate, and the third secondary gear drives the second turntable 143 to rotate.

Specifically, by moving the first crossbar 14414, the first rack 14413 drives the sixth gear 14422 to rotate, the sixth gear 14422 drives the fifth gear 14421 to rotate, and the fifth gear 14421 drives the second turntable 143 to rotate, thereby achieving mutual switching between the conductive adhesive button mode and the switch button mode.

Figure 12:
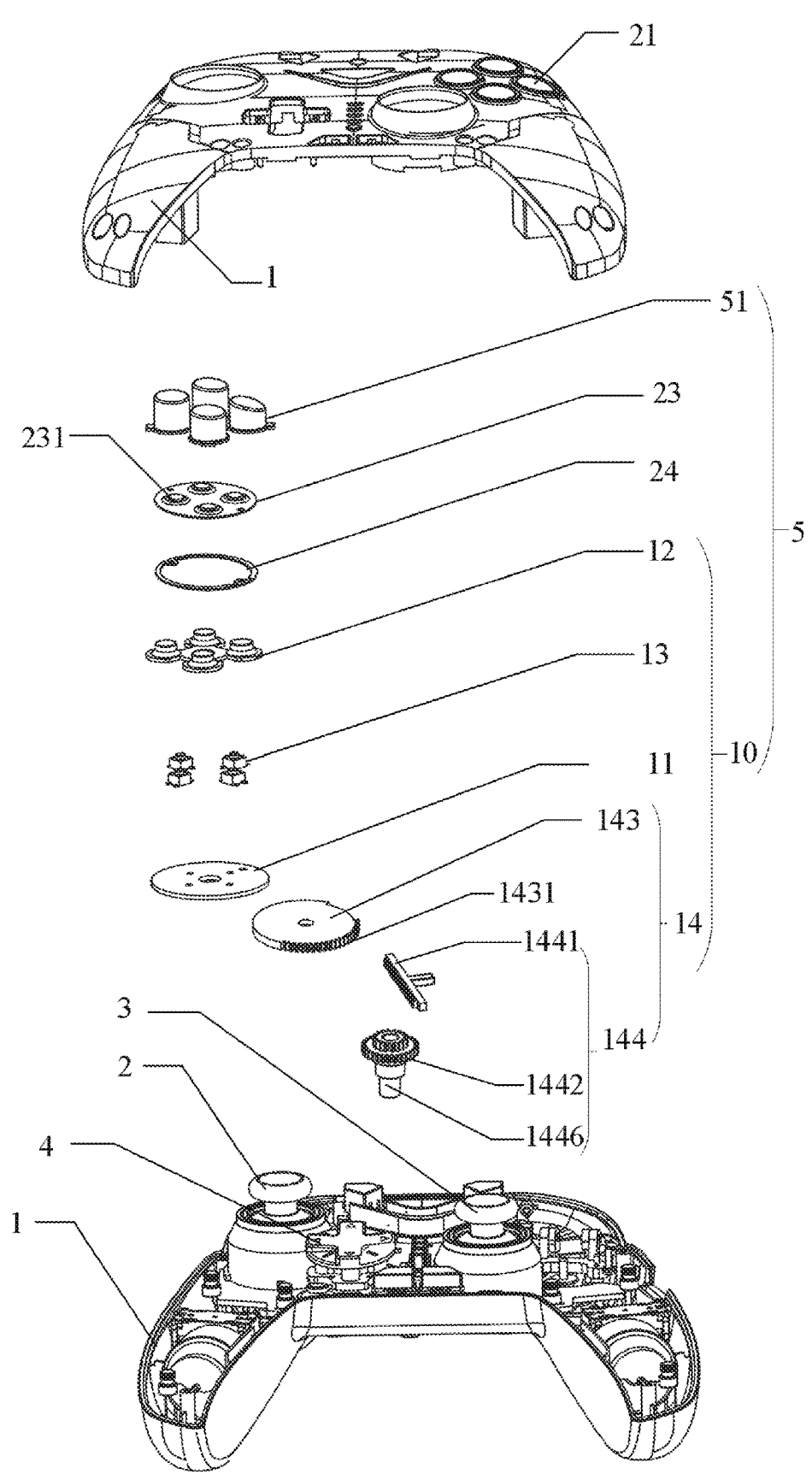
FIG. 12 is a schematic diagram of the structure of the seventh game controller embodiment.

FIG. 12 shows the structural diagram of the seventh game controller embodiment. Referring to FIG. 12, the game controller, comprising: the casing 1, the left joystick assembly 2, the right joystick assembly 3, the direction button assembly 4 and the function button assembly 5, the function button assembly 5 includes multiple function buttons 51 and the button module 10 as described in the fifth button module embodiment. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. The rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431. The first through-hole is provided near the function button 51 on the casing 1, and the driving part 1441 extends from the first through-hole to the outside of the casing 1, wherein the gear drive component 144 further includes a fourth support column 1446, and the driving part 1441 includes a first rack 14413, the transmission part 1442 includes a third secondary gear, and the third secondary gear is movably sleeved on the fourth support column 1446, the third secondary gear includes a fifth gear 14421 and a sixth gear 14422, the fifth gear 14421 meshes with the first gear teeth 1431, the sixth gear 14422 meshes with the first rack 14413, and a first crossbar 14414 is provided on the first rack 14413, the first crossbar 14414 extends from the first through-hole to the outside of casing 1, when the first crossbar 14414 is moved, the third secondary gear is driven to rotate, and the third secondary gear drives the second turntable 143 to rotate.

Specifically, by moving the first crossbar 14414, the first rack 14413 drives the sixth gear 14422 to rotate, the sixth gear 14422 drives the fifth gear 14421 to rotate, and the fifth gear 14421 drives the second turntable 143 to rotate, thereby achieving mutual switching between the conductive adhesive button mode and the switch button mode of the function button 51.

Furthermore, referring to FIG. 12, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 13:
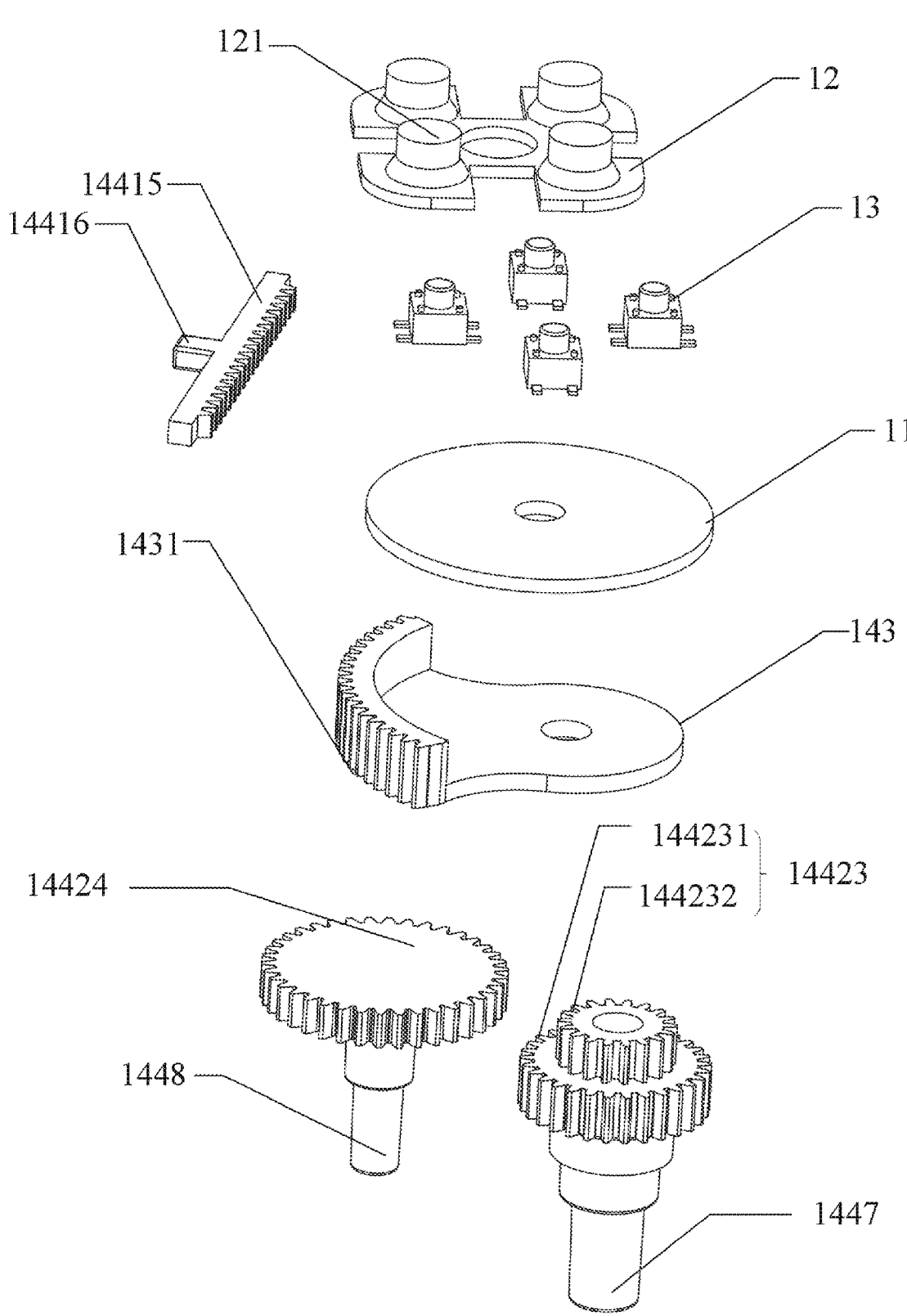
FIG. 13 is a schematic diagram of the structure of the sixth button module embodiment.

FIG. 13 shows the structural diagram of the sixth button module embodiment. Referring to FIG. 13, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the second turntable 143 and the gear drive component 144, and the circuit board 11 is disposed on the second turntable 143, the first gear teeth 1431 of the first preset length is provided on the edge of the second turntable 143, the gear drive component 144 includes the driving part 1441 and the transmission part 1442, the transmission part 1442 meshes with the first gear teeth 1431, when the driving part 1441 is driven, the transmission part 1442 is driven to rotate; the transmission part 1442 drives the second turntable 143 to rotate; the rotation of the second turntable 143 drives the circuit board 11 to rotate until each button contact on the conductive adhesive 12 faces the bottom end of one button on the game controller, or each switch 13 faces the bottom end of one button on the game controller, wherein the gear drive component 144 also includes a fifth support column 1447 and a sixth support column 1448, and the driving part 1441 includes a second rack 14415, the transmission part 1442 includes a fourth secondary gear 14423 and a second intermediate gear 14424. The fourth secondary gear 14423 is movably sleeved on the fifth support column 1447, the second intermediate gear 14424 is movably sleeved on the sixth support column 1448, and the fourth secondary gear 14423 includes a seventh gear 144231 and an eighth gear 144232, the seventh gear 144231 meshes with the second intermediate gear 14424, and the second intermediate gear 14424 meshes with the first gear teeth 1431, the eighth gear 144232 meshes with the second rack 14415, and a second crossbar 14416 is provided on the second rack 14415, when the second crossbar 14416 is moved, the fourth secondary gear 14423 is driven to rotate; the fourth secondary gear 14423 drives the second intermediate gear 14424 to rotate, and the second intermediate gear 14424 drives the second turntable 143 to rotate.

Specifically, by moving the second crossbar 14416, the second rack 14415 drives the fourth and second stage gears 14423 to rotate, the fourth and second stage gears 14423 drive the second intermediate gear 14424 to rotate, and the second intermediate gear 14424 drives the second turntable 143 to rotate, thereby achieving mutual switching between the conductive adhesive button mode and the switch button mode.

Figure 14:
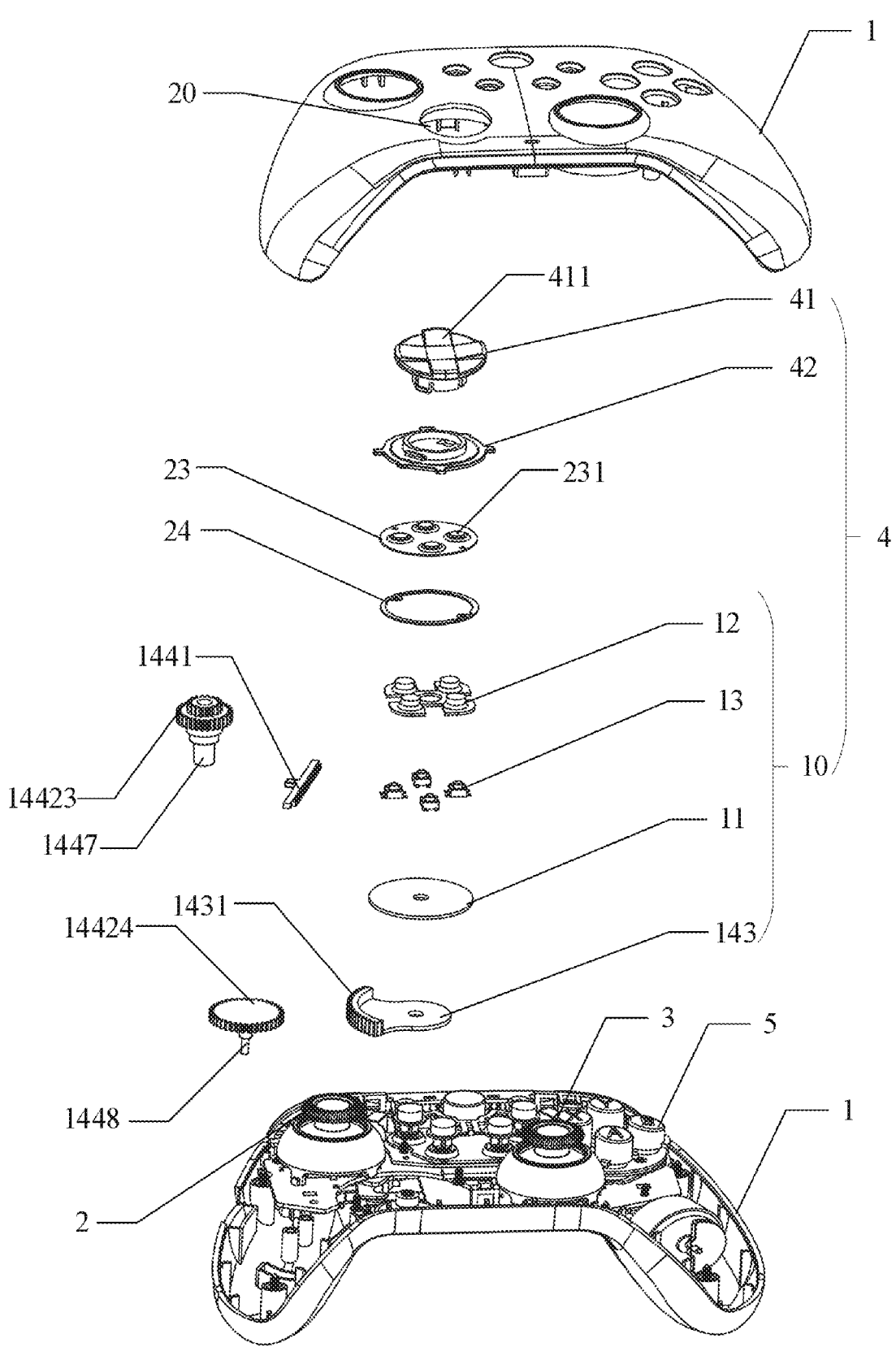
FIG. 14 is a schematic diagram of the structure of the eighth game controller embodiment.

FIG. 14 shows the structural diagram of the eighth game controller embodiment. Referring to FIG. 14, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the sixth button module embodiment. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the first turntable 141 and the toggle lever 142, which is set at the edge of the first turntable 141. The toggle lever 142 drives the first turntable 141 to rotate under external force. The circuit board 11 is located on the first turntable 141, and a second sliding slide 25 is set near the direction button 41 on the casing 1. The toggle lever 142 extends through the second sliding slide 25 to the outside of the casing 1, wherein the gear drive component 144 also includes a fifth support column 1447 and a sixth support column 1448, and the driving part 1441 includes a second rack 14415, the transmission part 1442 includes a fourth secondary gear 14423 and a second intermediate gear 14424. The fourth secondary gear 14423 is movably sleeved on the fifth support column 1447, the second intermediate gear 14424 is movably sleeved on the sixth support column 1448, and the fourth secondary gear 14423 includes a seventh gear 144231 and an eighth gear 144232, the seventh gear 144231 meshes with the second intermediate gear 14424, and the second intermediate gear 14424 meshes with the first gear teeth 1431, the eighth gear 144232 meshes with the second rack 14415, and a second crossbar 14416 is provided on the second rack 14415, when the second crossbar 14416 is moved, the fourth secondary gear 14423 is driven to rotate; the fourth secondary gear 14423 drives the second intermediate gear 14424 to rotate, and the second intermediate gear 14424 drives the second turntable 143 to rotate.

Specifically, by moving the second crossbar 14416, the second rack 14415 drives the fourth secondary gear 14423 to rotate, the fourth secondary gear 14423 drive the second intermediate gear 14424 to rotate, and the second intermediate gear 14424 drives the second turntable 143 to rotate, thereby achieving mutual switching between the conductive adhesive button mode and the switch button mode of the direction button 41.

Furthermore, referring to FIG. 14, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 15:
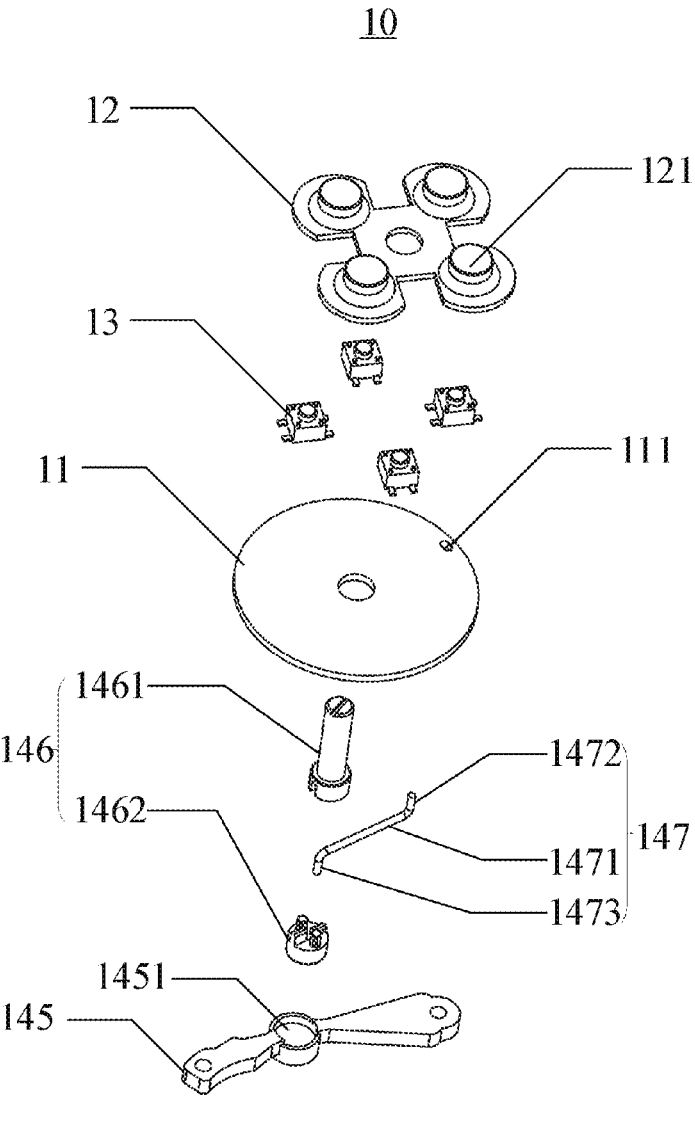
FIG. 15 is a schematic diagram of the structure of the seventh button module embodiment.

FIG. 15 shows the structural diagram of the seventh button module embodiment. Referring to FIG. 15, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes a bracket 145 and a rotating shaft component 146, and a groove 1451 is provided on the bracket 145, the bottom end of the rotating shaft component 146 is movably arranged in the groove 1451, the circuit board has a hole in the center and is sleeved on the rotating shaft component 146, a rotating connector 147 is also provided between the circuit board 11 and the rotating shaft component 146; when the rotating shaft component 146 is rotated, the rotating connector 147 drives the circuit board 11 to rotate until each button contact 121 on the conductive adhesive 12 faces the bottom end of one function button 51 on the game controller, or each switch 13 faces the bottom end of one function button 51 on the game controller.

The function button 51 module of this embodiment allows the rotating shaft component 146 to rotate by movable setting it on the bracket 145, and then the circuit board 11 is sleeved on the rotating shaft component 146, and the rotating connector 147 is set between the rotating shaft component 146 and circuit board 11, and two button circuits are set on circuit board 11. Then, conductive adhesive 12 and switch 13 are set on circuit board 11, each corresponding to one button circuit. When the rotating shaft component 146 is rotated, the rotating connector 147 drives the circuit board 11 to rotate so that each button contacts 121 on the conductive adhesive 12 is facing the bottom of one function button 51 on the game controller, or each switch 13 is facing the bottom of one function button 51 on the game controller. Thus, achieving mutual switching between conductive adhesive button mode and switch button mode, allowing users to experience two different tactile button modes through the game controller, without the need to purchase game controllers with different button modes separately, reducing user expenses and improving the user experience.

Figure 16:
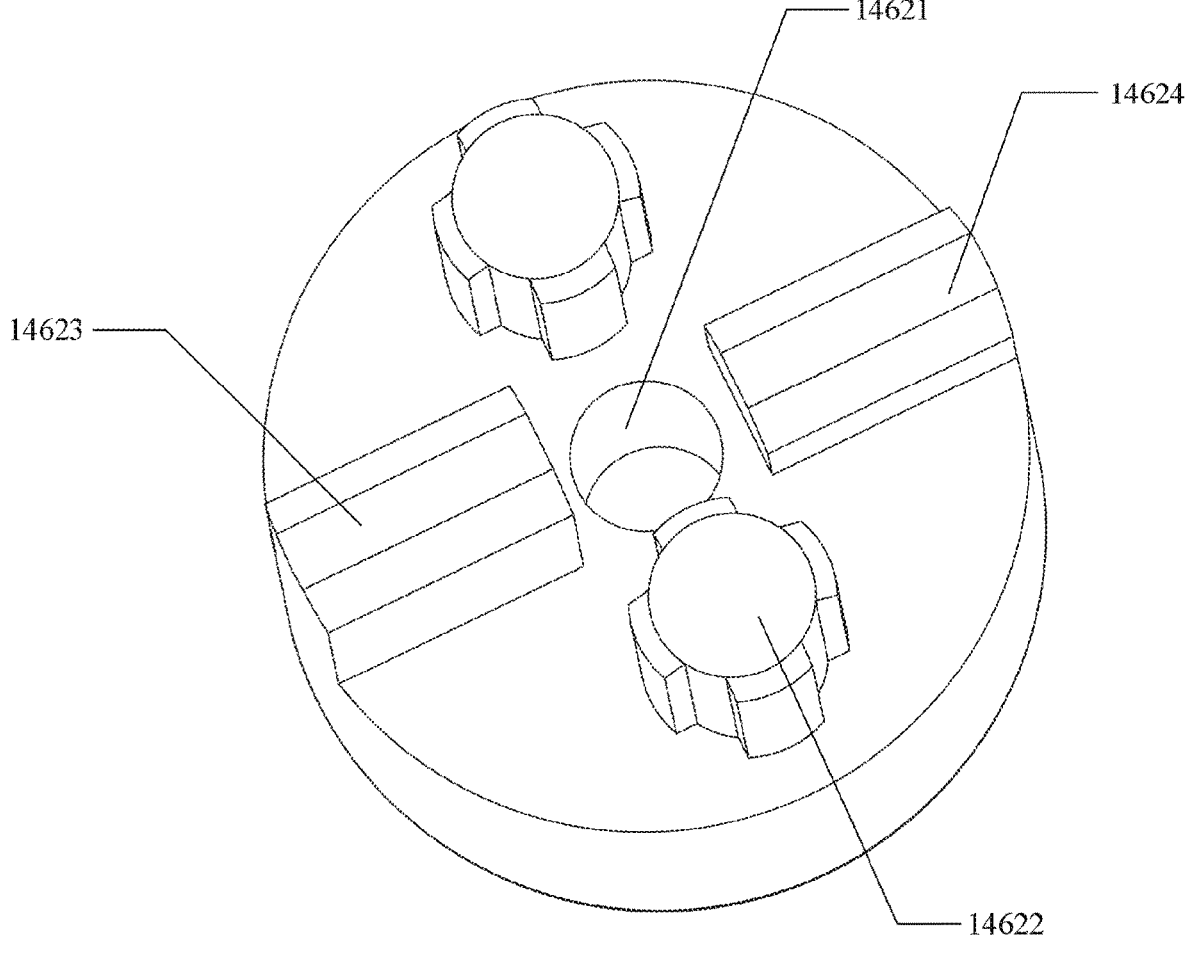
FIG. 16 is a schematic diagram of the structure of the base of the seventh button module embodiment.
Figure 17:
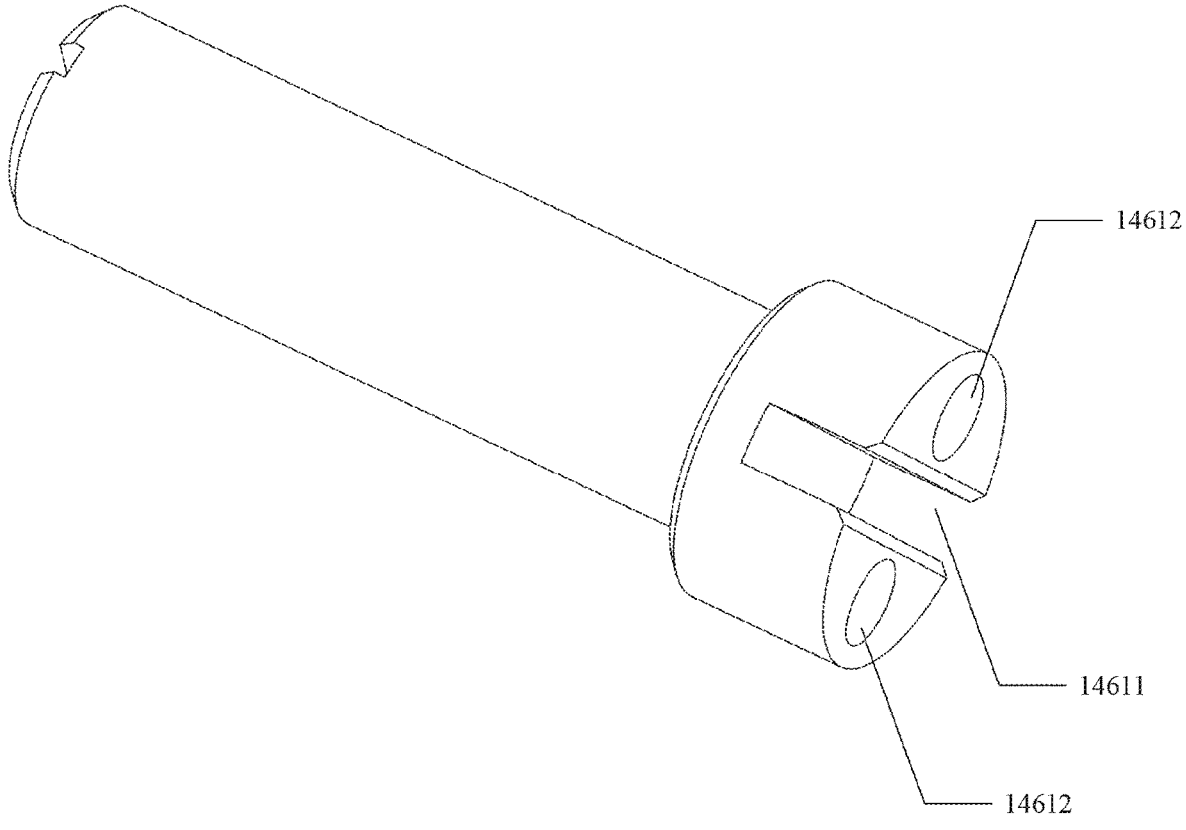
FIG. 17 is a schematic diagram of the structure of the rotating shaft of the seventh button module embodiment.

In this embodiment, the rotating connector 147 includes a connecting rod 1471, a first support rod 1472 and a second support rod 1473, the first support rod 1472 and the second support rod 1473 are vertically connected to both ends of the connecting rod 1471 respectively. Preferably, the first support rod 1472 and the second support rod 1473 are located on both sides of the connecting rod 1471 and are in the same plane. A first engaging hole 111 is set at the edge position away from the center opening on circuit board 11, which matches the size of the first support rod 1472. The first support rod 1472 is inserted into the first engaging hole 111 to be fixed in the first engaging hole 111. The second support rod 1473 is engaged on the rotating shaft component 146, so that when the rotating shaft component 146 rotates, a force can be applied to the circuit board 11 through the rotating connector 147, causing the circuit board 11 to rotate synchronously. The rotating shaft component 146 includes the rotating shaft 1461 and the base 1462. The size of the base 1462 matches the groove 1451. Preferably, the base 1462 is set in a cylindrical shape, and the groove 1451 is also set in a cylindrical groove 1451 to facilitate the rotation of the base 1462 in the groove 1451. As shown in FIG. 16, the base 1462 is equipped with a second engaging hole 14621 and a positioning column 14622 that matches the rotating connector 147. As shown in FIG. 17, the bottom end of the rotating shaft 1461 is equipped with a first limiting groove 14611 and a positioning hole 14612. The positioning column 14622 is engaged in the positioning hole 14612, thereby fixing the base 1462 and the rotating shaft 1461. The second support rod 1473 is engaged in the second engaging hole 14621, and the end area of the connecting rod 1471 near the second support rod 1473 is accommodated in the first limiting groove 14611. When the rotating shaft 1461 rotates, a force is applied to the connecting rod 1471 that is engaged in the first limiting groove 14611, causing the rotating connector 147 to rotate, thereby driving the circuit board 11 to rotate. In addition, there are first limiting column 14623 and the second limiting column 14624 on the base 1462 facing the first limiting groove 14611 area, which restrict the second support rod 1473 and connecting rod 1471. The second engaging hole 14621 is set between the first limiting column 14623 and the second limiting column 14624. The width of the first limiting column 14623 and the second limiting column 14624 match the width of the first limiting groove 14611. The height of the first limiting column 14623 is higher than that of the second limiting column 14624. When installing the base 1462 onto the bottom end of the rotating shaft 1461, the top of the first limiting column 14623 is just in contact with the bottom of the first limiting groove 14611, and there is an area exactly between the top of the second limiting column 14624 and the bottom of the first limiting groove 14611 for the connecting rod 1471 to pass through.

Furthermore, the top of the rotating shaft 1461 is equipped with a "one"-shaped groove.

Specifically, by setting a "one"-shaped groove at the top of the rotating shaft 1461, the user rotates the rotating shaft 1461 using a "one" shaped screwdriver.

Figure 18:
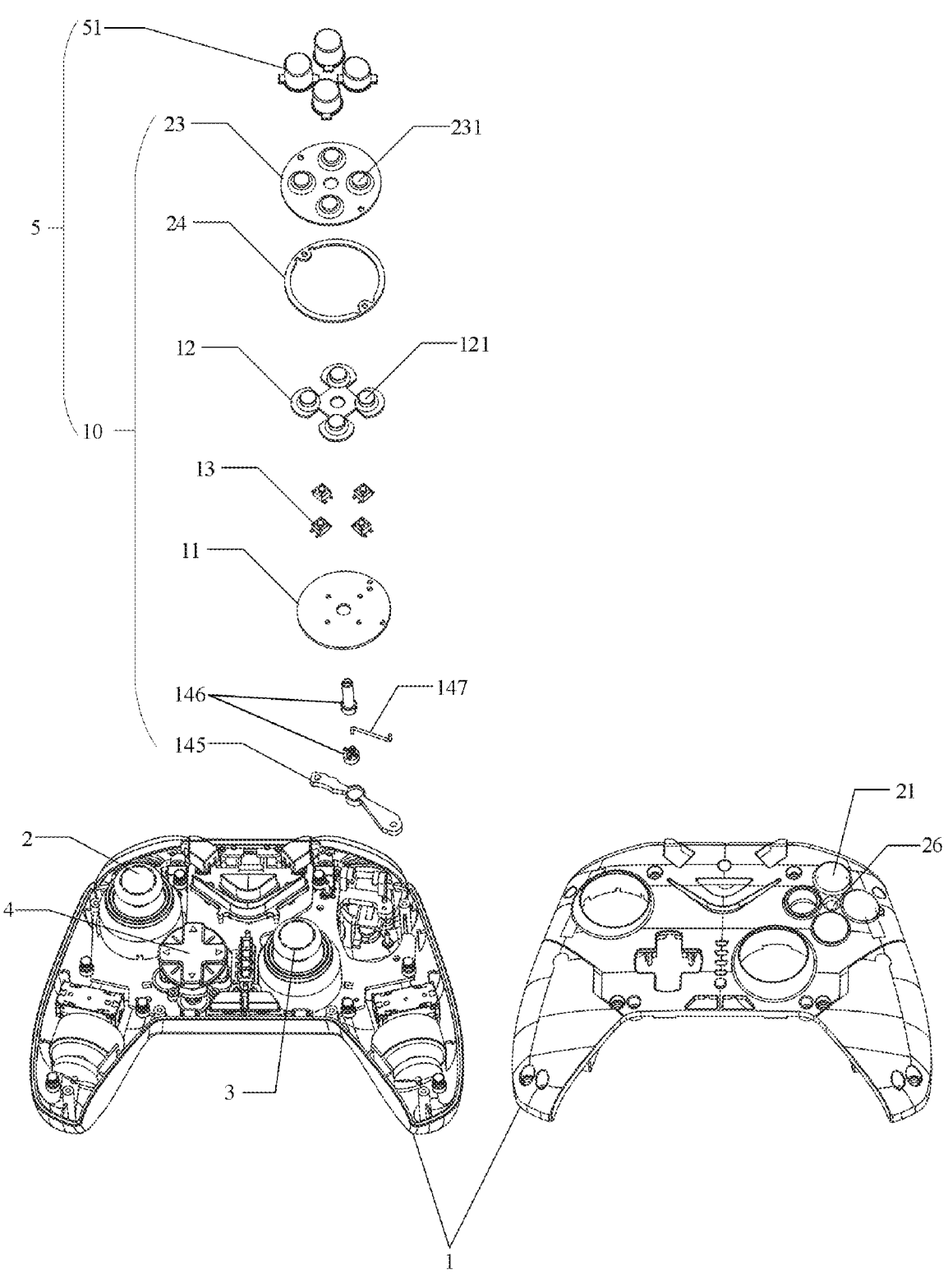
FIG. 18 is a schematic diagram of the structure of the ninth game controller embodiment.

FIG. 18 shows the structural diagram of the ninth game controller embodiment. Referring to FIG. 18, the game controller, comprising: the casing 1, the left joystick assembly 2, the right joystick assembly 3, the direction button assembly 4 and the function button assembly 5, the function button assembly 5 includes multiple function buttons 51 and the button module 10 described in the seventh button module embodiment of the above the button module 10. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. The rotating component 14 includes the bracket 145 and the rotating shaft component 146, and the groove 1451 is provided on the bracket 145, the bottom end of the rotating shaft component 146 is movably arranged in the groove 1451, the circuit board has a hole in the center and is sleeved on the rotating shaft component 146, the rotating connector 147 is also provided between the circuit board 11 and the rotating shaft component 146. The casing 1 is close to the function buttons 51 settings with a second through-hole 26, and the top of the rotating shaft component 146 extends from the second through-hole 26 to the outside of the casing 1. When the rotating shaft component 146 is rotated, the rotating connector 147 drives the circuit board 11 to rotate so that each button contacts 121 on the conductive adhesive 12 is facing the bottom of one function button 51 on the game controller, or each switch 13 is facing the bottom of one function button 51 on the game controller, thus achieving mutual switching between the conductive adhesive button mode and the switch button mode of function button 51.

Furthermore, referring to FIG. 18, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 19:
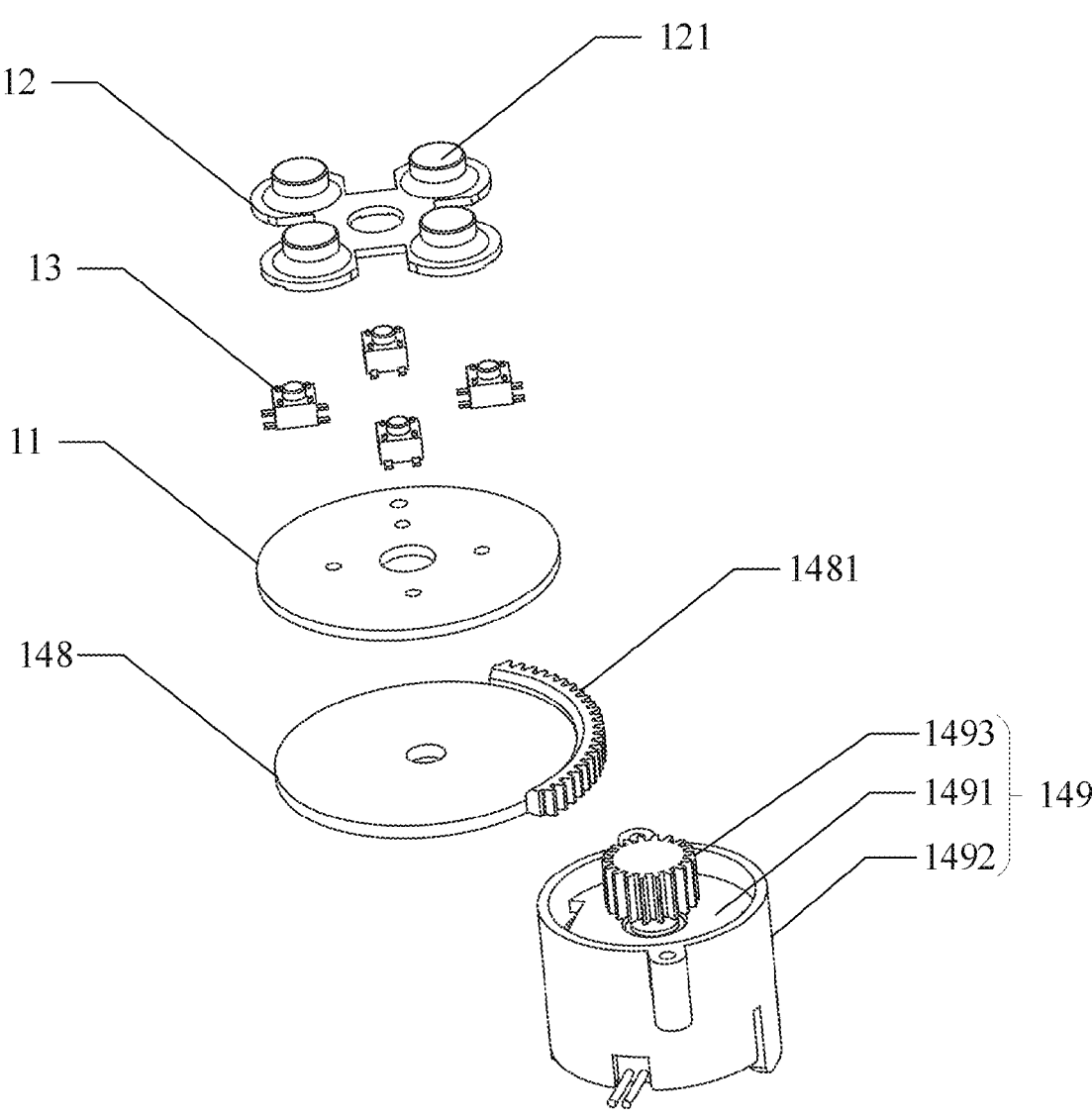
FIG. 19 is a schematic diagram of the structure of the eighth button module embodiment.

FIG. 19 shows the structural diagram of the eighth embodiment of the button module. Referring to FIG. 19, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes a third turntable 148, an electric drive component 149 and a drive switch 150 (not shown in FIG. 19, please refer to FIG. 20), a second gear teeth 1481 of a second preset length are provided on the edge of the third turntable 148, and the output end 1493 of the electric drive component 149 is engaged with the second gear teeth 1481, the circuit board 11 is disposed on the third turntable 148, and the drive switch 150 is electrically connected to the electric drive component 149; when the drive switch 150 is closed, the electric drive component 149 starts, and the output end 1493 of the electric drive component 149 drives the third turntable 148 to rotate; the third turntable 148 drives the circuit board 11 to rotate so that each button contact 121 on the conductive adhesive 12 faces the bottom end of one button on the game controller, or each switch 13 faces the bottom end of one button on the game controller.

Furthermore, the electric drive component 149 includes a motor 1491, a motor bracket 1492 and the output end 1493, the motor 1491 is arranged in the motor bracket 1492, and the output end 1493 is arranged on the output shaft of the motor 1491.

Furthermore, the output end 1493 includes a second driving gear 14931, the second driving gear 14931 is disposed on the output shaft of the motor 1491, and the second driving gear 14931 meshes with the second gear teeth 1481.

Specifically, when the user closes the drive switch 150, the motor 1491 starts, and the output shaft of the motor 1491 drives the second driving gear 14931 to rotate. The second driving gear 14931 drives the third turntable 148 to rotate, and the third turntable 148 rotates until each button contact 121 on conductive adhesive 12 is facing the bottom of one button on the game controller, or each switch 13 is facing the bottom of one button on the game controller.

Figure 20:
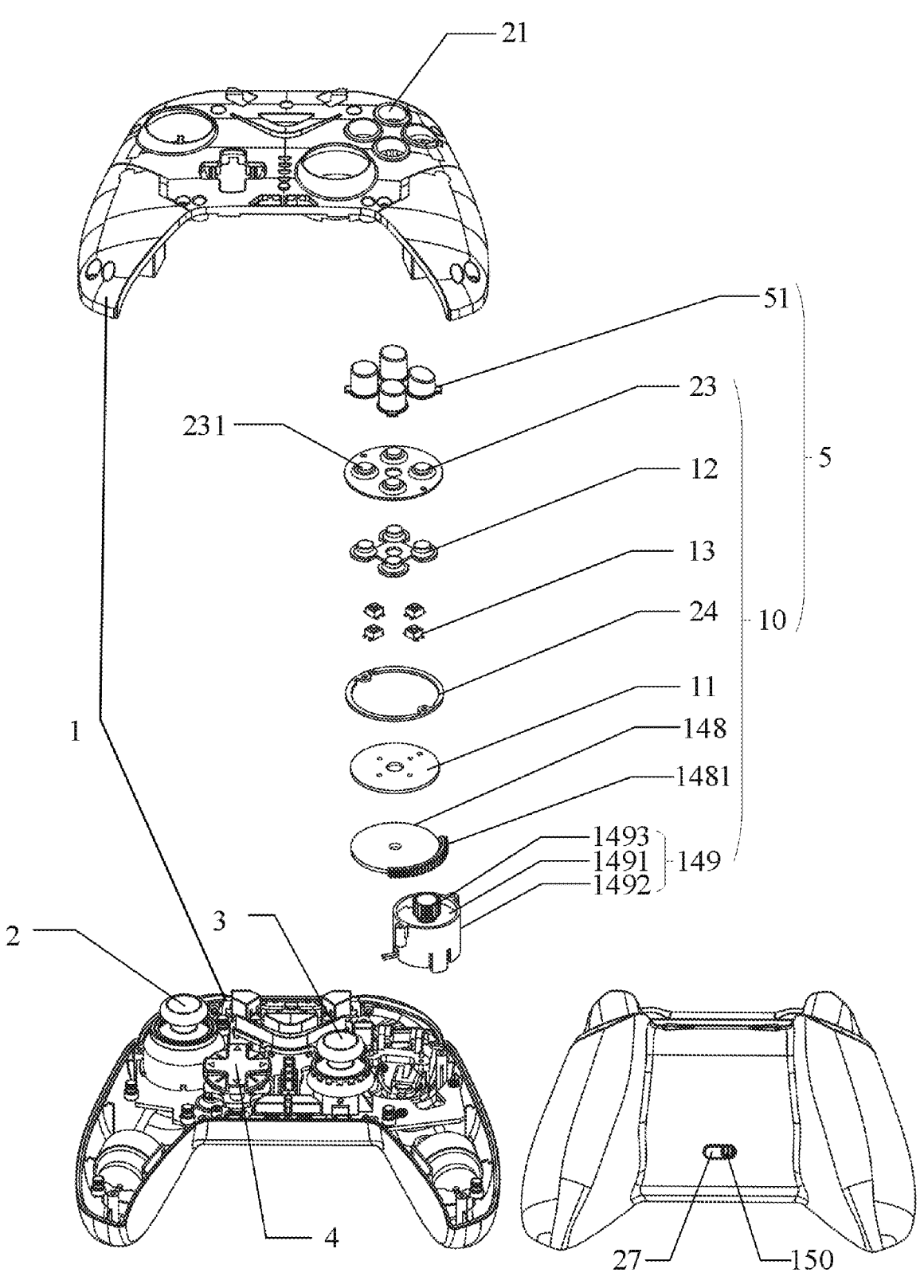
FIG. 20 is a schematic diagram of the structure of the tenth game controller embodiment.

FIG. 20 shows the structural diagram of the ninth embodiment of the game controller. Referring to FIG. 20, the game controller, comprising: the casing 1, the left joystick assembly 2, the right joystick assembly 3, the direction button assembly 4 and the function button assembly 5, the function button assembly 5 includes multiple function buttons 51 and the button module 10 described in the eighth button module embodiment of the above the button module 10. The function button 51 is arranged in the button hole 21 of the preset function button 51 on the casing 1, the button module, comprising: the circuit board 11, the conductive adhesive 12, the at least one switch 13 and the rotating component 14. The number of button contacts 121 and the number of switches 13 on the conductive adhesive 12 are equal to the number of function buttons 51. The button module 10 is arranged in the casing 1 and faces the bottom end of the function button 51; when the rotating component 14 rotates, the circuit board 11 is driven to rotate until each button contact 121 on the conductive adhesive 12 faces the bottom end of one function button 51, or each switch faces the bottom end of one function button 51. The rotating component 14 includes the third turntable 148, the electric drive component 149 and the drive switch 150, the second gear teeth 1481 of a second preset length are provided on the edge of the third turntable 148, and the output end 1493 of the electric drive component 149 is engaged with the second gear teeth 1481, the circuit board 11 is disposed on the third turntable 148, and the drive switch 150 is electrically connected to the electric drive component 149; the first installation hole 27 is set on the casing, and the drive switch 150 is set to the first installation hole 27.

Specifically, when the user closes the drive switch 150, the motor 1491 starts, and the output shaft of the motor 1491 drives the second driving gear 14931 to rotate. The second driving gear 14931 drives the turntable to rotate, which drives the circuit board 11 to rotate so that each button contacts 121 on conductive adhesive 12 is facing the bottom of one function button 51, or each switch 13 is facing the bottom of one function button 51.

Furthermore, referring to FIG. 20, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 21:
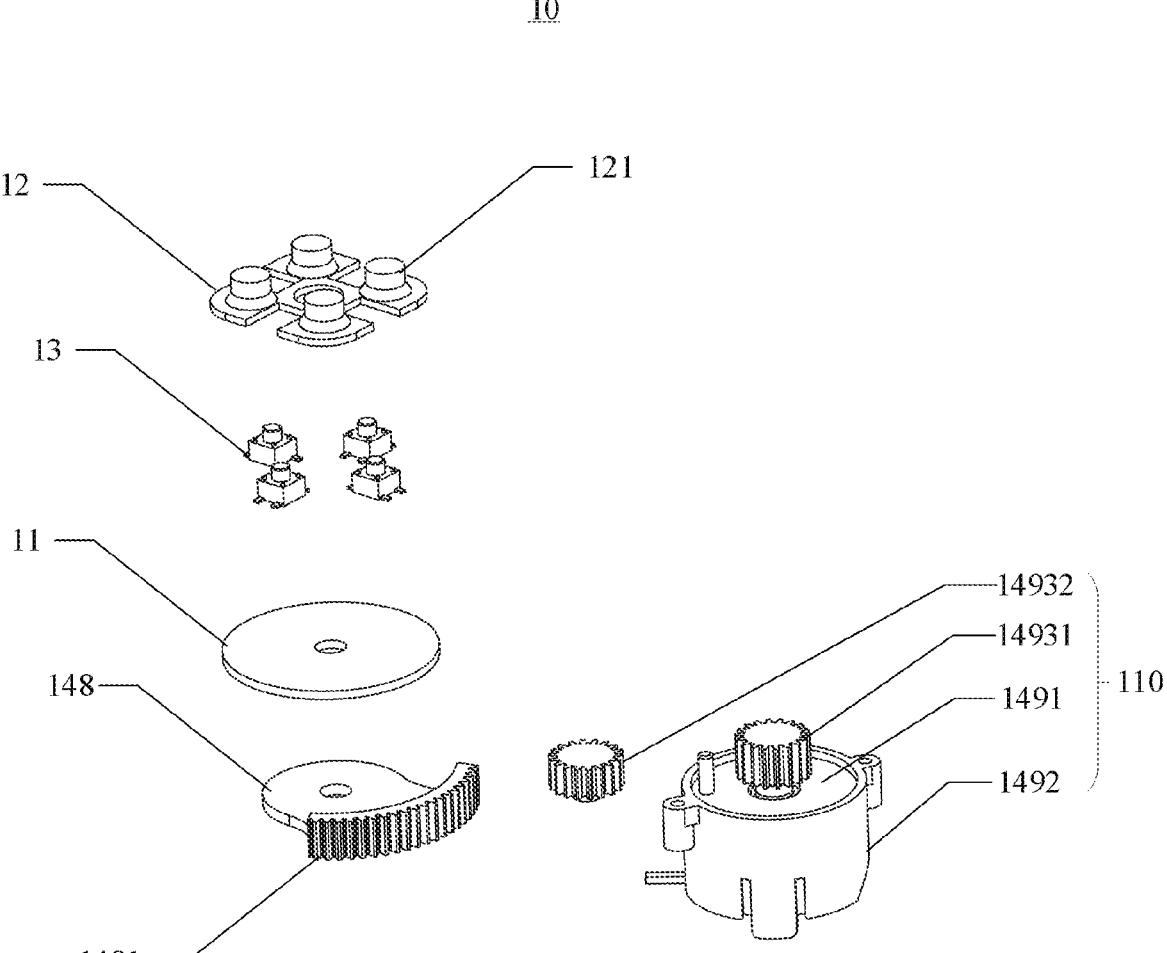
FIG. 21 is a schematic diagram of the structure of the ninth button module embodiment.

FIG. 21 shows the structural diagram of the eighth embodiment of the button module. Referring to FIG. 21, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes the third turntable 148, the electric drive component 149 and the drive switch 150, the second gear teeth 1481 of a second preset length are provided on the edge of the third turntable 148, and the output end 1493 of the electric drive component 149 is engaged with the second gear teeth 1481, the circuit board 11 is disposed on the third turntable 148, and the drive switch 150 is electrically connected to the electric drive component 149; when the drive switch 150 is closed, the electric drive component 149 starts, and the output end 1493 of the electric drive component 149 drives the third turntable 148 to rotate; the third turntable 148 drives the circuit board 11 to rotate so that each button contact 121 on the conductive adhesive 12 faces the bottom end of one button on the game controller, or each switch 13 faces the bottom end of one button on the game controller.

Furthermore, the electric drive component 149 includes the motor 1491, the motor bracket 1492 and the output end 1493, the motor 1491 is arranged in the motor bracket 1492, and the output end 1493 is arranged on the output shaft of the motor 1491.

Furthermore, the output end 1493 includes the second driving gear 14931, the second driving gear 14931 is disposed on the output shaft of the motor 1491, and the second driving gear 14931 meshes with the second gear teeth 1481.

Specifically, when the user closes the drive switch 150, the motor 1491 starts, and the output shaft of the motor 1491 drives the second driving gear 14931 to rotate. The second drive gear 14931 drives the transmission gear 14932 to rotate, and the transmission gear 14932 drives the turntable to rotate. The turntable rotates until each button contact 121 on conductive adhesive 12 is facing the bottom of one button on the game controller, or each switch 13 is facing the bottom of one button on the game controller.

Figure 22:
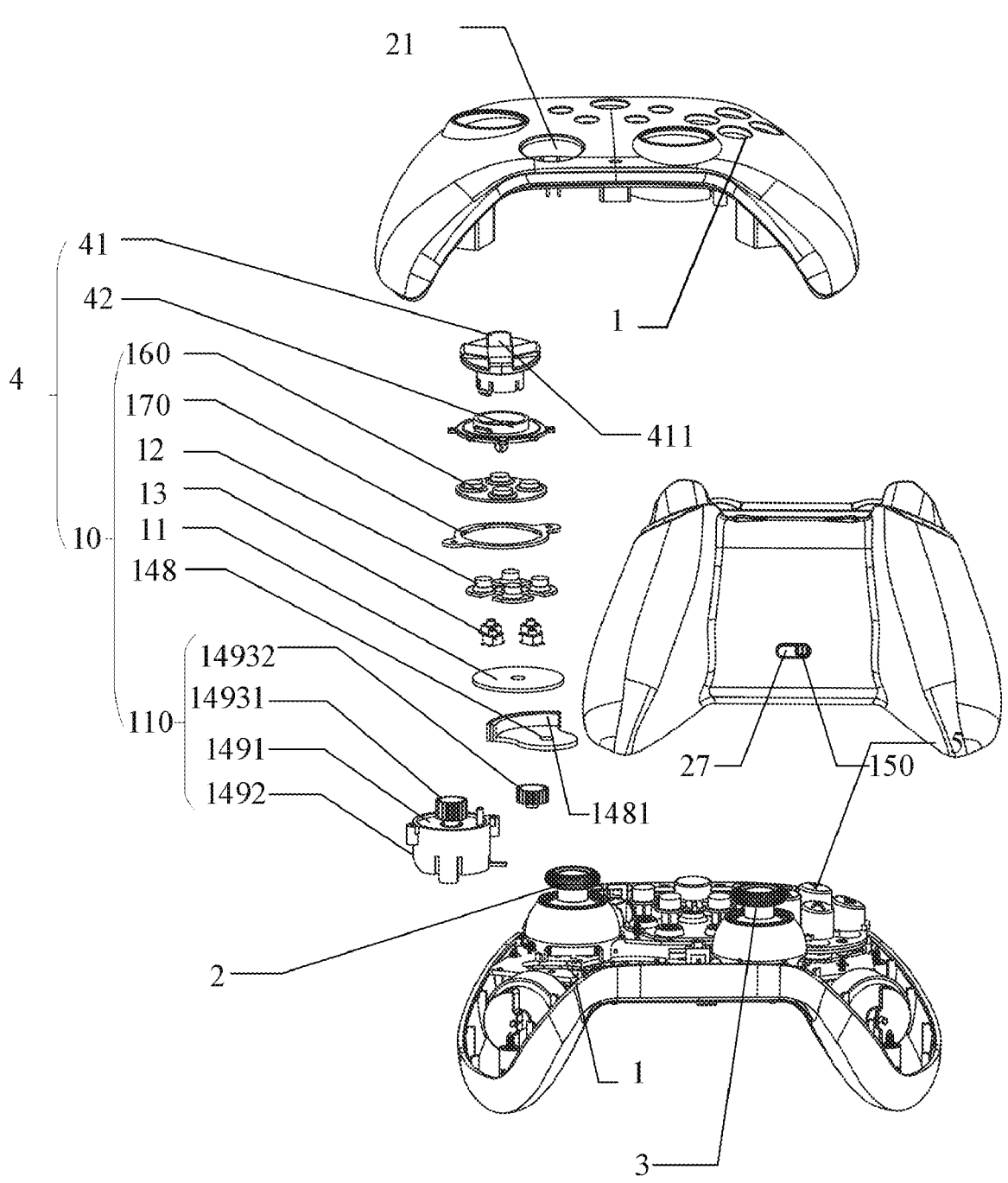
FIG. 22 is a schematic diagram of the structure of the eleventh game controller embodiment.

FIG. 22 shows the structural diagram of the eleventh embodiment of the game controller. Referring to FIG. 22, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the ninth embodiment of the button module. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the third turntable 148, the electric drive component 149 and the drive switch 150, the second gear teeth 1481 of a second preset length are provided on the edge of the third turntable 148, and the output end 1493 of the electric drive component 149 is engaged with the second gear teeth 1481, the circuit board 11 is disposed on the third turntable 148, and the drive switch 150 is electrically connected to the electric drive component 149; the first installation hole 27 is set on the casing, and the drive switch 150 is set to the first installation hole 27.

Furthermore, the electric drive component 149 includes the motor 1491, the motor bracket 1492 and the output end 1493, the motor 1491 is arranged in the motor bracket 1492, and the output end 1493 is arranged on the output shaft of the motor 1491.

Furthermore, the output end 1493 includes the second driving gear 14931, the second driving gear 14931 is disposed on the output shaft of the motor 1491, and the second driving gear 14931 meshes with the second gear teeth 1481.

Specifically, when the user closes the drive switch 150, the motor 1491 starts, and the output shaft of the motor 1491 drives the second driving gear 14931 to rotate. The second drive gear 14931 drives the transmission gear 14932 to rotate, and the transmission gear 14932 drives the turntable to rotate. The turntable rotates until each button contact 121 on conductive adhesive 12 is facing the bottom of one button on the game controller, or each switch 13 is facing the bottom of one button on the game controller.

Furthermore, referring to FIG. 22, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Figure 23:
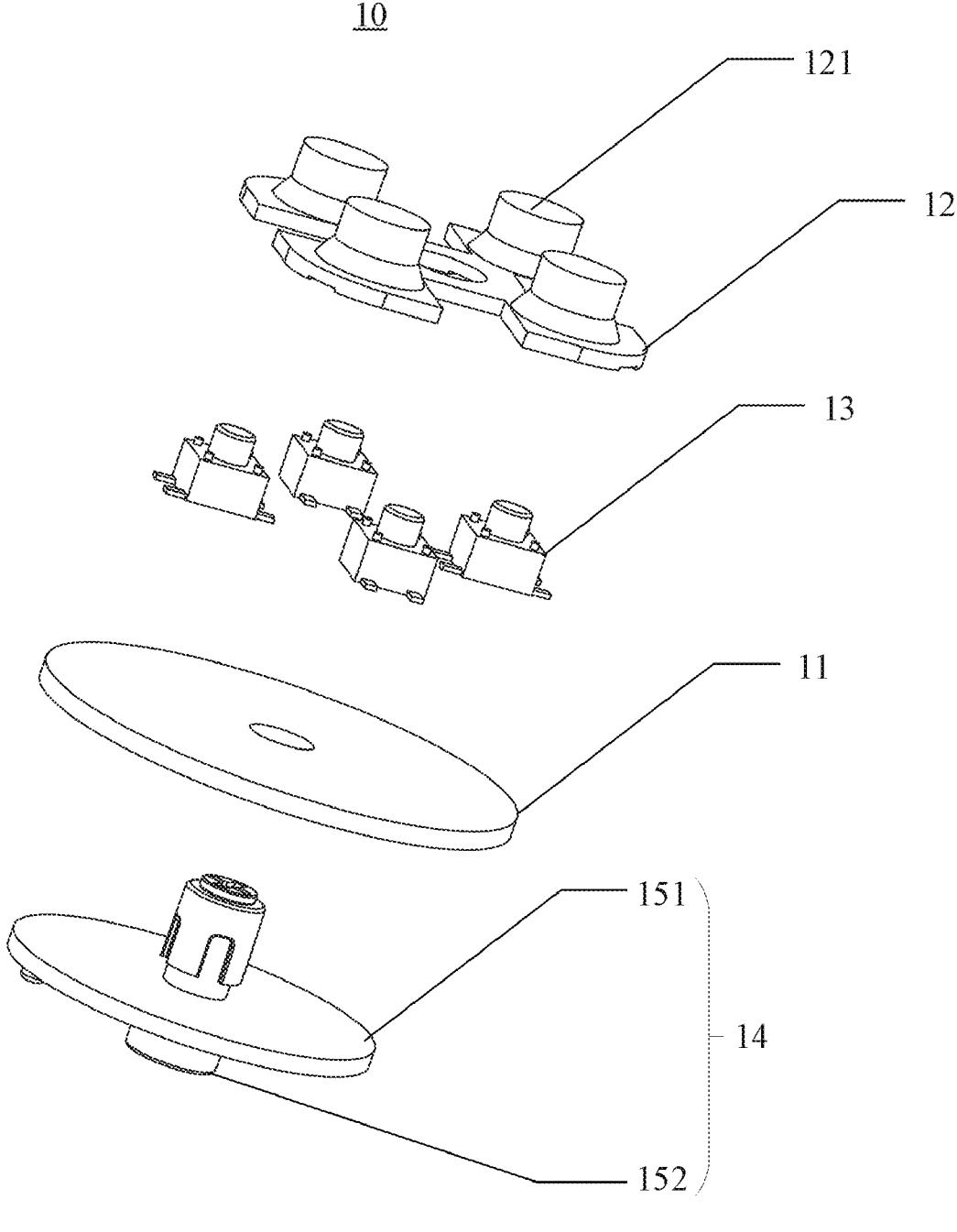
FIG. 23 is a schematic diagram of the structure of the tenth button module embodiment.

FIG. 23 shows the structural diagram of the tenth embodiment of the button module. Referring to FIG. 23, the button module 10, comprising: the circuit board 11, the conductive adhesive 12, the at least one switch 13 and the rotating component 14; the first button circuit and the second button circuit are arranged in parallel on the circuit board 11, when the first button circuit or the second button circuit is closed, a corresponding control signal is generated and output; the conductive adhesive 12 is arranged on the circuit board 11 and faces the first button circuit, the conductive adhesive 12 includes at least one button contact 121, when the button contact 121 is pressed, the first button circuit is closed; the at least one switch 13 is provided on the circuit board 11 and faces the second button circuit, when the switch 13 is pressed, the second button circuit is closed; the rotating component 14 includes a rotating disk 151, and a rotating cylinder 152 is provided at the center of the bottom surface of the rotating disk 151, the bottom surface of the rotating cylinder 152 is provided with a fillister, and the rotating disk 151 is fixedly connected to the circuit board 11; when the rotating cylinder 152 is rotated, the rotating disk 151 drives the circuit board 11 to rotate until each button contact on the conductive adhesive 12 faces the bottom end of one button on the game controller, or each switch 13 faces the bottom end of one button on the game controller.

Specifically, by setting the rotating disk 151 at the bottom of the circuit board 11, and then setting the rotating cylinder 152 at the center of the rotating disk 151, and setting fillister on the bottom surface of the rotating cylinder 152. When the tool is inserted into the fillister and rotated, the rotating disk 151 can be driven to rotate. The rotating disk 151 drives the circuit board 11 to rotate, and the circuit board 11 can rotate to switch the button mode between the conductive adhesive 12 and the switch 13.

Figure 24:
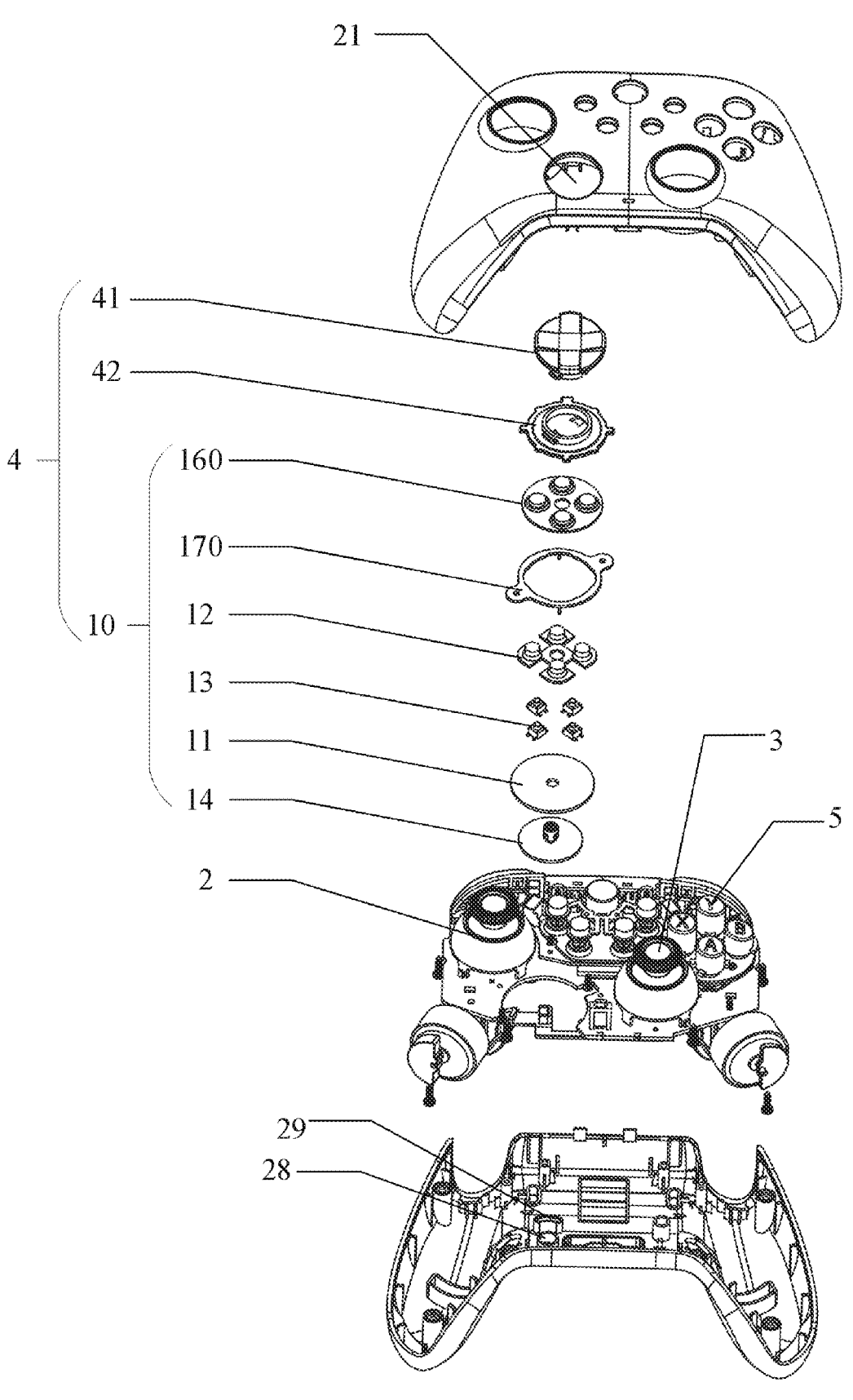
FIG. 24 is a schematic diagram of the structure of the twelfth game controller embodiment.

FIG. 24 shows the structural diagram of the twelfth embodiment of the game controller. Referring to FIG. 24, the game controller, comprising: the casing 1, the left joystick assembly 2, the right joystick assembly 3, the direction button assembly 4 and the function button assembly 5, the direction button assembly 4 includes direction buttons 41 and the button bracket 42, and the button module 10 as described in the tenth embodiment of the button module. The button bracket 42 is arranged inside the casing 1 and connected to the inner wall of the casing 1. The direction button 41 is arranged on the button bracket 42 and passes through the preset button hole 21 of the direction button 41 on the casing 1, the direction button 41 includes at least four button parts 411, the button module 10 includes the circuit board 11, the conductive adhesive 12, the at least one switch 13, and the rotating component 14. The number of button contacts 121 on conductive adhesive 12 and the number of switches 13 are equal to the number of button parts 411. The button module 10 is located inside the housing 1 and faces the bottom end of the directional button 41. When the rotating component 14 rotates, it drives the circuit board 11 to rotate until each button contact 121 on the conductive adhesive 12 is facing the bottom end of one button part 411, or each switch 13 is facing the bottom end of one button part 411. The rotating component 14 includes the rotating disk 151, and the rotating cylinder 152 is provided at the center of the bottom surface of the rotating disk 151, the bottom surface of the rotating cylinder 152 is provided with the fillister (not shown in the figure). The rotating disk 151 is fixedly connected to the circuit board 11, and the bottom surface of the casing 1 is equipped with the third through-hole 28 that matches the rotating cylinder 152. The bottom end of the rotating cylinder 152 extends from the third through-hole 28 to the outside of the game controller.

Specifically, when the rotating cylinder 152 is rotated, the rotating disk 151 drives the circuit board 11 to rotate so that each button contacts 121 on the conductive adhesive 12 is facing the bottom of one button part 411, or each switch 13 is facing the bottom of one button part 411, thereby achieving mutual switching between the conductive adhesive button mode and the switch button mode of the direction button 41.

Furthermore, a third limiting column (not shown in the figure) is also provided on the bottom surface of the rotating disk 151, and the second limiting groove 29 is also provided on the inner bottom surface of the casing 1. The third limiting column is sliding and arranged inside the second limiting groove 29. When the rotating disk 151 rotates, the third limiting column slides inside the second limiting groove 29. When it rotates to the bottom of each button contact 121 on the conductive adhesive 12 facing one button part 411, the third limiting column just rotates to one end of the second limiting groove 29. When it rotates to the bottom of each button part 411 facing each switch 13, the third limiting column just rotates to the other end of the second limiting groove 29.

This embodiment limits the rotation angle of circuit board 11 through the second limiting groove 29, allowing users to accurately switch between conductive adhesive button mode and switch button mode.

Furthermore, referring to FIG. 24, the game controller also includes the silicone pad 23 and the silicone bracket 24, the silicone bracket 24 is connected with the inner wall of the casing 1 of the game controller, the silicone pad 23 is set on the silicone bracket 24, and the bottom of the function button 51 is pressed against the silicone pad 23.

Specifically, in this embodiment, by setting the silicone pad 23, on one hand, it plays a dust-proof role, avoiding the malfunction of button circuit conductivity caused by dust entering the button hole of the function button 51 and falling onto the circuit board 11. On the other hand, it plays a buffering role. The function button 51 is usually made of hard rubber material, and the silicone pad 23 can avoid direct contact between the function button 51 and the conductive adhesive 12 or the switch 13, reduce its wear on the conductive adhesive 12 or the switch 13, and improve the service life of the conductive adhesive 12 and the switch 13.

In order to improve the triggering effect of buttons and reduce the occurrence of ineffective buttons, based on the above embodiments, in other embodiments, the silicone pad 23 is equipped with button protrusions 231 corresponding to the function buttons 51. The button protrusion 231 is connected to the bottom end of the function button 51. When the rotating component 14 rotates, it drives the circuit board 11 to rotate until each button contact 121 on the conductive adhesive 12 is facing the bottom end of one button protrusion 231, or each switch 13 is facing the bottom end of one button protrusion 231.

Specifically, by setting the corresponding button protrusions 231 on the silicone pad 23, when the function buttons 51 are pressed, the bottom of the function buttons 51 contact and compress the button protrusions 231. Then, the button protrusion 231 is used to compress the conductive adhesive 12 or the switch 13. By increasing the squeezing effect on the conductive adhesive 12 and the switch 13 through the button protrusion 231, the button circuit can be connected every time the button is pressed, avoiding the situation where the button fails due to poor contact between the conductive adhesive 12 or the switch 13 and the button circuit due to insufficient pressing distance.

Above are only preferred embodiments of the present disclosure and are not intended to limit the present disclosure. Any modification, equivalent replacement and improvement made within spirit and principle of the present disclosure should be included in protection scope of the present disclosure.

What is claimed is:

1. A button module, comprising:
a circuit board, a conductive adhesive, at least one switch and a rotating component;
a first button circuit and a second button circuit are arranged in parallel on the circuit board, when the first button circuit or the second button circuit is closed, a corresponding control signal is generated and output;
the conductive adhesive is arranged on the circuit board and faces the first button circuit, the conductive adhesive comprises at least one button contact, and when the button contact is pressed, the first button circuit is closed;
the at least one switch is provided on the circuit board and faces the second button circuit, when the switch is pressed, the second button circuit is closed;
the rotating component is connected to the circuit board, when the rotating component rotates, the circuit board is driven to rotate until each button contact on the conductive adhesive faces the bottom end of one button on the game controller, or each switch faces the bottom end of one button on the game controller;
the rotating component includes a turntable and a gear drive component, and the circuit board is disposed on the second turntable, a gear teeth of a preset length is provided on the edge of the turntable, the gear drive component includes a driving part and a transmission part, the transmission part meshes with the gear teeth of the preset length, when the driving part is driven, the transmission part is driven to rotate; the transmission part drives the turntable to rotate; the rotation of the turntable drives the circuit board to rotate until each button contact on the conductive adhesive faces the bottom end of one button on the game controller, or each switch faces the bottom end of one button on the game controller.

2. The button module of claim 1, wherein the driving part includes a driving shaft, and the transmission part includes a driving gear, the driving gear is disposed at the top of the driving shaft and meshes with the gear teeth of the preset length, the bottom end of the driving shaft is provided with a slot, when the driving shaft is rotated, the driving gear drives the turntable to rotate.

3. The button module of claim 1, wherein the gear drive component also includes a first support column, the driving part includes a first gear, and the transmission part includes a second gear, the first gear and the second gear constitute a first secondary gear, the first secondary gear is movably arranged on the first support column, and the second gear meshes with the gear teeth of the preset length, when the first gear is rotated, the second gear drives the turntable to rotate.

4. The button module of claim 1, wherein the gear drive component also includes a second support column and a third support column, the driving part includes a second secondary gear, and the transmission part includes a first intermediate gear; the second secondary gear is movably sleeved on the second support column, and the first intermediate gear is movably sleeved on the third support column, the second secondary gear includes a third gear and a fourth gear, the third gear meshes with the first intermediate gear, the first intermediate gear meshes with the gear teeth of the preset length; when the fourth gear is driven, the third gear drives the first intermediate gear to rotate, and the first intermediate gear drives the turntable to rotate.

5. The button module of claim 1, wherein the gear drive component further includes a fourth support column, and the driving part includes a first rack, the transmission part includes a third secondary gear, and the third secondary gear is movably sleeved on the fourth support column, the third secondary gear includes a fifth gear and a sixth gear, the fifth gear meshes with the gear teeth of the preset length, the sixth gear meshes with the first rack, and a first crossbar is provided on the first rack, when the first crossbar is moved, the third secondary gear is driven to rotate, and the third secondary gear drives the turntable to rotate.

6. The button module of claim 1, wherein the gear drive component also includes a fifth support column and a sixth support column, and the driving part includes a second rack, the transmission part includes a fourth secondary gear and a second intermediate gear, the fourth secondary gear is movably sleeved on the fifth support column, the second intermediate gear is movably sleeved on the sixth support column, and the fourth secondary gear includes a seventh gear and an eighth gear, the seventh gear meshes with the second intermediate gear, and the second intermediate gear meshes with the gear teeth of the preset length, the eighth gear meshes with the second rack, and a second crossbar is provided on the second rack, when the second crossbar is moved, the fourth secondary gear is driven to rotate; the fourth secondary gear drives the second intermediate gear to rotate, and the second intermediate gear drives the turntable to rotate.

7. A button module, comprising:

a circuit board, a conductive adhesive, at least one switch and a rotating component;

a first button circuit and a second button circuit are arranged in parallel on the circuit board, when the first button circuit or the second button circuit is closed, a corresponding control signal is generated and output;

the conductive adhesive is arranged on the circuit board and faces the first button circuit, the conductive adhesive comprises at least one button contact, and when the button contact is pressed, the first button circuit is closed;

the at least one switch is provided on the circuit board and faces the second button circuit, when the switch is pressed, the second button circuit is closed;

the rotating component is connected to the circuit board, when the rotating component rotates, the circuit board is driven to rotate until each button contact on the conductive adhesive faces the bottom end of one button on the game controller, or each switch faces the bottom end of one button on the game controller;

the rotating component includes a bracket and a rotating shaft component, and a groove is provided on the bracket, the bottom end of the rotating shaft component is movably arranged in the groove, the circuit board has a hole in the center and is sleeved on the rotating shaft component, a rotating connector is also provided between the circuit board and the rotating shaft component;

when the rotating shaft component is rotated, the rotating connector drives the circuit board to rotate until each button contact on the conductive adhesive faces the bottom end of one function button on the game controller, or each switch faces the bottom end of one function button on the game controller.

8. The button module of claim 7, wherein the rotating connector includes a connecting rod, a first support rod and a second support rod, the first support rod and the second support rod are vertically connected to both ends of the connecting rod respectively, and a first engaging hole is provided at the edge of the circuit board, the first support rod is engaged in the first engaging hole, and the second support rod is engaged on the rotating shaft component.

9. The button module of claim 8, wherein the rotating shaft component includes a rotating shaft and a base, the size of the base matches the groove, the base is provided with a second engaging hole and a positioning column that match the rotating connector, and the bottom end of the rotating shaft is provided with a first limiting groove and a positioning hole, the positioning column is engaged in the positioning hole, and the second support rod is engaged in the second engaging hole, and the end area of the connecting rod close to the second support rod is received in the first limiting groove.

10. The button module of claim 9, wherein a first limiting column and a second limiting column are also provided on the base in an area facing the first limiting groove, the second engaging hole is provided between the first limiting column and the second limiting column, the width of the first limiting column and the second limiting column matches the width of the first limiting groove, the first limiting column is accommodated in the first limiting groove and the top of the first limiting column is in contact with the bottom of first limiting groove, the second limiting column is accommodated in the first limiting groove, and there is a gap between the top of the second limiting column and the bottom of the first limiting groove for the connecting rod to pass through.

11. A button module, comprising:

a circuit board, a conductive adhesive, at least one switch and a rotating component;

a first button circuit and a second button circuit are arranged in parallel on the circuit board, when the first button circuit or the second button circuit is closed, a corresponding control signal is generated and output;

the conductive adhesive is arranged on the circuit board and faces the first button circuit, the conductive adhesive comprises at least one button contact, and when the button contact is pressed, the first button circuit is closed;

the at least one switch is provided on the circuit board and faces the second button circuit, when the switch is pressed, the second button circuit is closed;

the rotating component is connected to the circuit board, when the rotating component rotates, the circuit board is driven to rotate until each button contact on the conductive adhesive faces the bottom end of one button on the game controller, or each switch faces the bottom end of one button on the game controller;

the rotating component includes a turntable, an electric drive component and a drive switch, a gear teeth of a preset length are provided on the edge of the turntable, and the output end of the electric drive component is engaged with the gear teeth, the circuit board is disposed on the turntable, and the drive switch is electrically connected to the electric drive component; when the drive switch is closed, the electric drive component starts, and the output end of the electric drive component drives the turntable to rotate; the turntable drives the circuit board to rotate so that each button contact on the conductive adhesive faces the bottom end of one button on the game controller, or each switch faces the bottom end of one button on the game controller.

12. The button module of claim 11, wherein the electric drive component includes a motor, a motor bracket and the output end, the motor is arranged in the motor bracket, and the output end is arranged on the output shaft of the motor.

13. The button module of claim 12, wherein the output end includes a driving gear, the driving gear is disposed on the output shaft of the motor, and the driving gear meshes with the gear teeth.

14. The button module of claim 12, wherein the output end includes a driving gear and a transmission gear, and the driving gear is provided on the output shaft of the motor, the transmission gear meshes with the driving gear and the gear teeth of the preset length respectively.

15. A game controller, comprising: a casing, a left joystick assembly, a right joystick assembly, a direction button assembly and a function button assembly, wherein the function button assembly includes a plurality of function buttons and the button module of claim 1, the function buttons are arranged in button holes of preset function buttons on the casing, the button module, comprising: the circuit board, the conductive adhesive, the at least one switch and the rotating component; the number of button contacts and the number of switches on the conductive adhesive are equal to the number of function buttons; the button module is arranged in the casing and faces the bottom end of the function button; when the rotating component rotates, the circuit board is driven to rotate until each button contact on the conductive adhesive faces the bottom end of one function button, or each switch faces the bottom end of one function button.

16. A game controller, comprising: the casing, the left joystick assembly, the right joystick assembly, the direction button assembly and the function button assembly, wherein direction button assembly includes the direction button, a button bracket and the button module of claim 1; the button bracket is arranged in the casing and connected to the inner surface of the casing, the direction buttons are arranged on the button bracket and pass through the button holes of the preset direction buttons on the casing, the direction button includes at least four button parts; the button module, comprising: the circuit board, the conductive adhesive, the at least one switch and the rotating component; the number of button contacts and the number of switches on the conductive adhesive are equal to the number of the button parts, the button module is arranged in the casing and faces the bottom end of the direction button, when the rotating component rotates, the circuit board is driven to rotate until each button contact on the conductive adhesive faces the bottom end of one button part, or each switch faces the bottom end of one button part.

* * * * *